(12) United States Patent
Suganuma

(10) Patent No.: US 6,448,996 B2
(45) Date of Patent: Sep. 10, 2002

(54) IMAGE RECORDING APPARATUS AND METHOD OF GENERATING PIXEL CLOCK

(75) Inventor: Atsushi Suganuma, Mimaniashigara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 43 days.

(21) Appl. No.: 09/775,829

(22) Filed: Feb. 5, 2001

(30) Foreign Application Priority Data

Feb. 4, 2000 (JP) .................................... 2000-027621
Feb. 4, 2000 (JP) .................................... 2000-027632

(51) Int. Cl.$^7$ ............................................... B41J 2/435
(52) U.S. Cl. ........................ 347/248; 347/249; 347/234
(58) Field of Search ................................. 347/248, 249, 347/234, 235, 250, 116, 133, 37

(56) References Cited

U.S. PATENT DOCUMENTS 6,219,085 B1 * 4/2001 Hanna ......................... 347/249
6,259,467 B1 * 7/2001 Hanna ......................... 347/249

FOREIGN PATENT DOCUMENTS

| JP | 5-207250 | 8/1993 | ............ H04N/1/23 |
| JP | 9-149211 | 6/1997 | ............ H04N/1/06 |
| JP | 10-16290 | 1/1998 | ............ B41J/2/44 |

OTHER PUBLICATIONS

Patent Abstracts of Japan 09149211 A, Jun. 6, 1997.
Patent Abstracts of Japan 05207250 A, Aug. 13, 1993.
Patent Abstracts of Japan 10016290 A, Jan. 20, 1998.

* cited by examiner

*Primary Examiner*—Lamson D. Nguyen
(74) *Attorney, Agent, or Firm*—Sughrue Mion, PLLC

(57) ABSTRACT

An image is accurately recorded by a light beam on a PS plate wound on a drum which is rotating at a constant speed. A rotary encoder detects information of a recording position in a main scanning direction by the light beam that is emitted from an optical unit to the PS plate. Based on the detected information, a PLL circuit of a recording synchronizing signal generating unit generates an original clock. Pulses of the original clock are counted by a decimating counter, which outputs a decimating instruction to decimate a pulse from the original clock each time the count reaches a preset count. Based on the decimating instruction, a pulse is decimated from the original clock, and a decimated clock is frequency-divided at a fixed frequency-dividing ratio by a frequency divider, which outputs a pixel clock for recording the image. Since the frequency of the pixel clock is varied by decimating the original clock based on the preset count, the image can accurately be recorded on the PS plate by determining in advance the preset count depending on the positional relationship between the PS plate and the optical unit.

13 Claims, 14 Drawing Sheets

IMAGE RECORDING APPARATUS AND METHOD OF GENERATING PIXEL CLOCK

BACKGROUND OF THE INVENTION

1. Field of the Invention

The present invention relates to an image recording apparatus having an image recording means for recording a two-dimensional image on a recording sheet such as a photosensitive medium held on the outer or inner circumferential surface of a drum, an a method of generating a pixel clock, which is preferably applicable to such an image recording apparatus.

2. Description of the Related Art

There have heretofore been known external surface scanning light beam image recording apparatus for recording a two-dimensional image on the entire surface of a recording medium on the outer circumferential surface of a cylindrical drum by rotating the drum, scanning the recording medium with an intensity-modulated light beam emitted from an optical system in a main scanning direction, and moving the optical system in an axial direction of the drum thereby to scan the recording medium in an auxiliary scanning direction transverse to the main scanning direction. See, for example, Japanese laid-open patent publications Nos. 5-207250, 9-149211, and 10-16290, for details.

The drum, which has a diameter of 300 mm and a length of 1 m and is made of aluminum or the like, of those disclosed external surface scanning light beam image recording apparatus actually suffers various dimensional errors. For example, the drum has various diameter and outer circumferential surface dimension variations, which fall within a machining tolerance range, caused in the manufacturing process, and also have eccentricity errors introduced when the drums are assembled. Consequently, even when the drum is rotated at a constant speed, the circumferential speed of the outer circumferential surface of the drum is not constant. With the irregular circumferential speed, when an image is plotted on the photosensitive medium by the light beam that is intensity-modulated, e.g., selectively turned on and off, with pixel clock pulses at constant intervals, the recorded image tends to be unduly expanded or contracted in local regions.

One solution proposed in the known apparatus has been to measure a distortion of an image which has been plotted with pixel clock pulses and correcting the spaced intervals of the pixel clock pulses when the image is actually recorded for thereby minimizing expansions and contractions of the image. According to the system disclosed in Japanese laid-open patent publication No. 5-207250, the frequency-diving ratio of a PLL circuit which generates pixel clock pulses is varied to correct the spaced intervals of the pixel clock pulses. However, the disclosed solution is disadvantageous in that the image tends to be distorted due to a pull-in time of the PLL circuit at the time the frequency-diving ratio thereof is varied.

The technique revealed in Japanese laid-open patent publication No. 9-149211 corrects the spaced intervals of pixel clock pulses by changing an input voltage applied to a voltage-controlled oscillator. The revealed technique is also problematic in that the image is liable to suffer a new distortion owing to the temperature characteristics of the voltage-controlled oscillator.

It has been proposed to use a programmable delay line or a plurality of delay lines to correct clock pulse positions for solving the problem disclosed in Japanese patent laid-open publication No. 5-207250 or Japanese laid-open patent publication No. 9-149211. However, a correcting circuit made of inexpensive delay line or lines fails to achieve a required level of accuracy and resolution.

To eliminate the above difficulties, the system disclosed in Japanese laid-open patent publication No. 10-16290 employs, as shown in FIGS. 13 and 14 of the accompanying drawings, a rotary encoder 1 mounted on the shaft of a motor for rotating the drum to generate a fundamental clock whose frequency is multiplied to produce an original clock by a PLL circuit 2. The pulses of the original clock are digitally counted by a counter 3. The counter 3 comprises a preset down counter and functions as a frequency divider, and is also referred to as a frequency divider. Based on the count from the counter 3, a CPU 4 reads correcting data from a correcting data memory 5. Based on the read correcting data, a control circuit 6 selects a frequency-dividing ratio of the counter or frequency divider 3 to divide the frequency of the original clock from the PLL circuit 2 by 7, 8, or 9.

The disclosed system can achieve a required level of accuracy and resolution because the clock pulse positions are corrected digitally by the counter 3 and a clock adjusting means 7 which is made up of the CPU 4, the corrective data memory 5, and the control circuit 6.

The correcting data are produced as follows: The circumferential surface of the drum that corresponds to a full image surface is developed into a flat rectangular surface, which is divided along main and auxiliary scanning directions into a mesh pattern of small rectangular cells or grip points, and correcting data for the respective rectangular cells or grid points are stored as original correcting data in the correcting data memory 5. The CPU 4 calculates, from coordinates to be recorded next that are obtained by counting pixel clock pulses and the stored original correcting data, correcting data for the coordinate position to be recorded next, and determines a recording time based on the calculated correcting data.

However, the above technique is disadvantageous in that when an exposure recording condition such as a dot per inch (DPI) with respect to the photosensitive medium is changed, it is necessary to calculate and regenerate original correcting data for respective grid points of the full image surface, and hence the productivity is greatly reduced.

The foregoing drawback may be eliminated by generating original correcting data for respective grid points of the full image surface with respect to each exposure recording condition and storing the generated original correcting data in the correcting data memory. This approach is highly costly because a large-storage-capacity semiconductor memory or a hard disk is needed as the correcting data memory for storing such original correcting data.

If clock pulse positions are to be corrected in view of the expansion or contraction of the drum due to environmental temperature changes, then it is necessary to store original correcting data for each temperature, resulting in a possible further increase in the cost. The system shown in FIGS. 13 and 14 is also problematic in that it requires a complex control process for the control circuit 6 to set frequency-dividing ratios in the counter or frequency divider 3 for small variations of clock pulse positions to be corrected, the CPU 4 requires a considerable power to generate a correcting table for setting frequency-dividing ratios, and the correcting data memory 5 needs a large storage capacity for storing the calculated data.

In addition, the original clock outputted from the PLL circuit 2, whose frequency is 8 times the frequency of the pixel clock, is usually frequency-divided by 8 and partly frequency-divided by 7 or 9 by the counter or frequency divider 3, for the correction of pixel clock positions. Therefore, pixel clock positions are corrected in fixed positions along the main scanning direction at all times, so that an image produced on the photosensitive medium tends to suffer a quality degradation such as a striped irregularity or a moiré pattern.

SUMMARY OF THE INVENTION

It is therefore an object of the present invention to provide an image recording apparatus which has a relatively simple arrangement capable of stably correcting a distortion of an image, such as an expansion or a contraction, due to an error of a mechanical system for holding a recording sheet for recording the image thereon, for thereby accurately recording or reproducing the image on the recording sheet, and a method of generating a pixel clock in such an image recording apparatus.

Another object of the present invention is to provide an image recording apparatus which is capable of generating and holding data for correcting the level of graphical accuracy efficiently with a resource saver, against a distortion of an image, such as an expansion or a contraction, due to an error of a mechanical system for holding a recording sheet for recording an image thereon, and a method of generating a pixel clock in such an image recording apparatus.

Still another object of the present invention is to provide an image recording apparatus which will not produce a quality degradation such as a striped irregularity or a moiré pattern in a recorded image, and a method of generating a pixel clock in such an image recording apparatus.

According to the present invention, there is provided an image recording apparatus has image recording means for scanning a recording sheet in a main scanning direction to record an image on the recording sheet, the image recording means being movable in an auxiliary scanning direction Y substantially perpendicular to the main scanning direction X to record a two-dimensional image on the recording sheet. The image recording apparatus comprises means for detecting recording position information in the main scanning direction, original clock generating means for generating an original clock based on the recording position information in the main scanning direction, decimation counting means for counting pulses of the original clock and outputting a decimating instruction to decimate a pulse from the original clock each time a preset count is reached, decimating means for decimating a pulse from the original clock based on the decimating instruction, and frequency-dividing means for frequency-dividing a decimated clock at a fixed frequency-dividing ratio and outputting the frequency-divided clock as a pixel clock for recording the image.

With the above arrangement, since the frequency of the pixel clock is varied by decimating the original clock based on the preset count, the image can accurately be recorded on the recording sheet by determining in advance the preset count depending on the positional relationship between the recording sheet and the image recording means.

The recording sheet may comprise a photosensitive medium such as PS plate, a photosensitive film, or the like, or a printing sheet of paper, or a metal plate such as an aluminum sheet or the like.

The image recording means may comprise an optical system for emitting a light beam to be applied to the recording sheet. The optical system allows pixels having a diameter of 10 μm or less to be produced with the light beam emitted thereby. If a PS plate is used as the recording sheet, it allows the image recording apparatus to be constructed as a CTP (Computer To Plate) apparatus.

The image recording means may comprise an ink jet head 134 for applying an ink I to the recording sheet, and the image recording apparatus may further comprise a rotatable drum with the recording sheet mounted on an outer circumferential surface thereof, means for controlling the ink jet head to apply the ink to scan the recording sheet on the rotatable drum in the main scanning direction to record the image on the recording sheet, and means for moving the ink jet head in the auxiliary scanning direction Y along an axis of the rotatable drum to record the two-dimensional image on the recording sheet. With this arrangement, the image recorded on the recording sheet can maintain a desired level of dimensional accuracy irrespective of variations of the diameter of the drum.

The image recording apparatus may further comprise a rotatable drum with the recording sheet mounted on an outer circumferential surface thereof, means for controlling the optical system to apply the light beam to scan the recording sheet on the rotatable drum in the main scanning direction to record the image on the recording sheet, and means for moving the optical system in the auxiliary scanning direction along an axis of the rotatable drum to record the two-dimensional image on the recording sheet. With this arrangement, the image recorded on the recording sheet can maintain a desired level of dimensional accuracy irrespective of variations of the diameter of the drum.

The image recording apparatus may further comprise a drum with the recording sheet mounted on an inner circumferential surface thereof, means for rotating the optical system about an axis of the drum to cause the light beam emitted from the optical system to scan the recording sheet on the rotatable drum in the main scanning direction to record the image on the recording sheet, and means for moving the optical system in the auxiliary scanning direction along the axis of the drum to record the two-dimensional image on the recording sheet. With this arrangement, the image recorded on the recording sheet can maintain a desired level of dimensional accuracy irrespective of variations of the diameter of the drum.

The image recording apparatus may further comprise means for detecting information per revolution of the drum, the decimation counting means comprising means for resetting the count of the original clock and thereafter starting to count the original clock to the preset count when the information per revolution of the drum is detected. Therefore, if necessary, a correcting value can be varied for each main scanning line thereby to facilitate a fine correcting process.

Similarly, the image recording apparatus may further comprise means for detecting information per revolution of the optical system, the decimation counting means comprising means for resetting the count of the original clock and thereafter starting to count the original clock to the preset count when the information per revolution of the drum is detected. Therefore, if necessary, a correcting value can be varied for each main scanning line thereby to facilitate a fine correcting process.

The image recording apparatus may further comprise random number generating means for generating a random number, the decimation counting means comprising means for setting a first preset count of the original clock after the count is reset to a value corresponding to the random number generated by the random number generating means, and outputting a decimating instruction to set a second and subsequent preset count of the original count to the preset count. Consequently, pixel clock positions are prevented from being corrected in fixed positions along the main scanning direction at all times, so that an image produced on the recording sheet does not suffer a quality degradation such as a striped irregularity or a moiré pattern.

The first preset count of the original clock after the count is reset may be set to the random number between a value of 0 and the preset value. The random number generating means is thus simple in structure, and corrected positions are prevented from being displaced largely.

The preset count may be determined depending on either one of a diameter of the drum, a temperature of the image recording apparatus, or a thickness of the recording sheet. Thus, images to be recorded can accurately be corrected with respect to such various parameters.

According to the present invention, there is also provided a method of generating a pixel clock to correct a graphical accuracy distortion of an image recorded on a recording sheet in an image recording apparatus which has image recording means for scanning a recording sheet mounted on a mechanical component in a main scanning direction to record an image on the recording sheet per pulse of the pixel clock, the image recording means being movable in an auxiliary scanning direction substantially perpendicular to the main scanning direction to record a two-dimensional image on the recording sheet, the method comprising the steps of generating mechanical component correcting data based on a relative positional relationship between the mechanical component and the image recording means, and controlling a time to generate the pixel clock to energize the image recording means based on the mechanical component correcting data and proportional component correcting data corresponding to recording conditions for the image recording means to record the image on the recording sheet, when the image is recorded on the recording sheet by the image recording means.

With the above arrangement, the time to generate the pixel clock is controlled based on the mechanical component correcting data based on the relative positional relationship between the mechanical component and the image recording means and the proportional component correcting data Dp corresponding to recording conditions for the image recording means to record the image on the recording sheet.

The mechanical component correcting data include main and auxiliary scanning direction components each kept for one line, and the proportional component correcting data is not kept but recalculated each time recording conditions are determined. Therefore, the amount of correcting data that is generated and held is minimized.

The proportional component correcting data comprises either one of data of the recording resolution on the recording sheet, the thickness of the recording sheet, and the temperature in the image recording apparatus, for example.

The image recording means may comprise an optical system for emitting a light beam to be applied to the recording sheet.

The image recording means may comprise an ink jet head for applying an ink to the recording sheet, the image recording apparatus further comprising a rotatable drum with the recording sheet mounted on an outer circumferential surface thereof, means for controlling the ink jet head to apply the ink to scan the recording sheet on the rotatable drum in the main scanning direction to record the image on the recording sheet, and means for moving the ink jet head in the auxiliary scanning direction along an axis of the rotatable drum to record the two-dimensional image on the recording sheet. With this arrangement, the image recorded on the recording sheet can maintain a desired level of dimensional accuracy irrespective of variations of the diameter of the drum.

The mechanical component may comprise a rotatable drum with the recording sheet mounted on an outer circumferential surface thereof, the image recording apparatus further comprising means for controlling the optical system to apply the light beam to scan the recording sheet on the rotatable drum in the main scanning direction to record the image on the recording sheet, and means for moving the optical system in the auxiliary scanning direction along an axis of the rotatable drum to record the two-dimensional image on the recording sheet.

The mechanical component may comprise a rotatable drum with the recording sheet mounted on an inner circumferential surface thereof, the image recording apparatus further comprising means for rotating the optical system about an axis of the drum to cause the light beam emitted from the optical system to scan the recording sheet on the rotatable drum in the main scanning direction to record the image on the recording sheet, and means for moving the optical system in the auxiliary scanning direction along the axis of the drum to record the two-dimensional image on the recording sheet.

The mechanical component correcting data may preferably be generated as main scanning component correcting data for correcting a graphical accuracy distortion in a circumferential direction of the drum, and auxiliary scanning component correcting data for correcting a graphical accuracy distortion in an axial direction of the drum.

According to the present invention, there is further provided an image recording apparatus comprising image recording means for scanning a recording sheet mounted on a mechanical component in a main scanning direction to record an image on the recording sheet per pulse of a pixel clock, the image recording means being movable in an auxiliary scanning direction substantially perpendicular to the main scanning direction to record a two-dimensional image on the recording sheet, means for detecting recording position information in the main scanning direction, original clock generating means for generating an original clock based on the recording position information in the main scanning direction, decimation counting means for counting pulses of the original clock and outputting a decimating instruction to decimate a pulse from the original clock each time a preset count is reached, decimating means for decimating a pulse from the original clock based on the decimating instruction, frequency-dividing means for frequency-dividing a decimated clock at a fixed frequency-dividing ratio and outputting the frequency-divided clock as a pixel clock for recording the image, storage means for storing mechanical component correcting data based on a relative positional relationship between the mechanical component and the image recording means, and decimating value calculating means for calculating the preset count from the mechanical component correcting data stored in the storage means and proportional component correcting data corresponding to recording conditions for the image recording means to record the image on the recording sheet, and setting the calculated preset count in the decimation counting means.

Since the decimating value calculating means calculates the preset count set in the decimation counting means from the mechanical component correcting data stored in the storage means and proportional component correcting data corresponding to recording conditions for the image recording means to record the image on the recording sheet, data for correcting the graphical accuracy can be generated and held efficiently with a resource saver against a distortion of an image, such as an expansion or a contraction, due to an error of a mechanical system for holding the recording sheet.

The image recording apparatus may further comprise means for detecting information per revolution of the drum, and random number generating means for generating a random number. The decimation counting means may comprise means for, when the count of the original clock is reset and thereafter the original clock starts to be counted to the preset count when the information per revolution of the drum is detected, setting a first preset count of the original clock after the count is reset to a value corresponding to the random number generated by the random number generating means, and outputting a decimating instruction to set a second and subsequent preset count of the original count to the preset count. Consequently, pixel clock positions are prevented from being corrected in fixed positions along the main scanning direction at all times, so that an image produced on the recording sheet does not suffer a quality degradation such as a striped irregularity or a moiré pattern.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
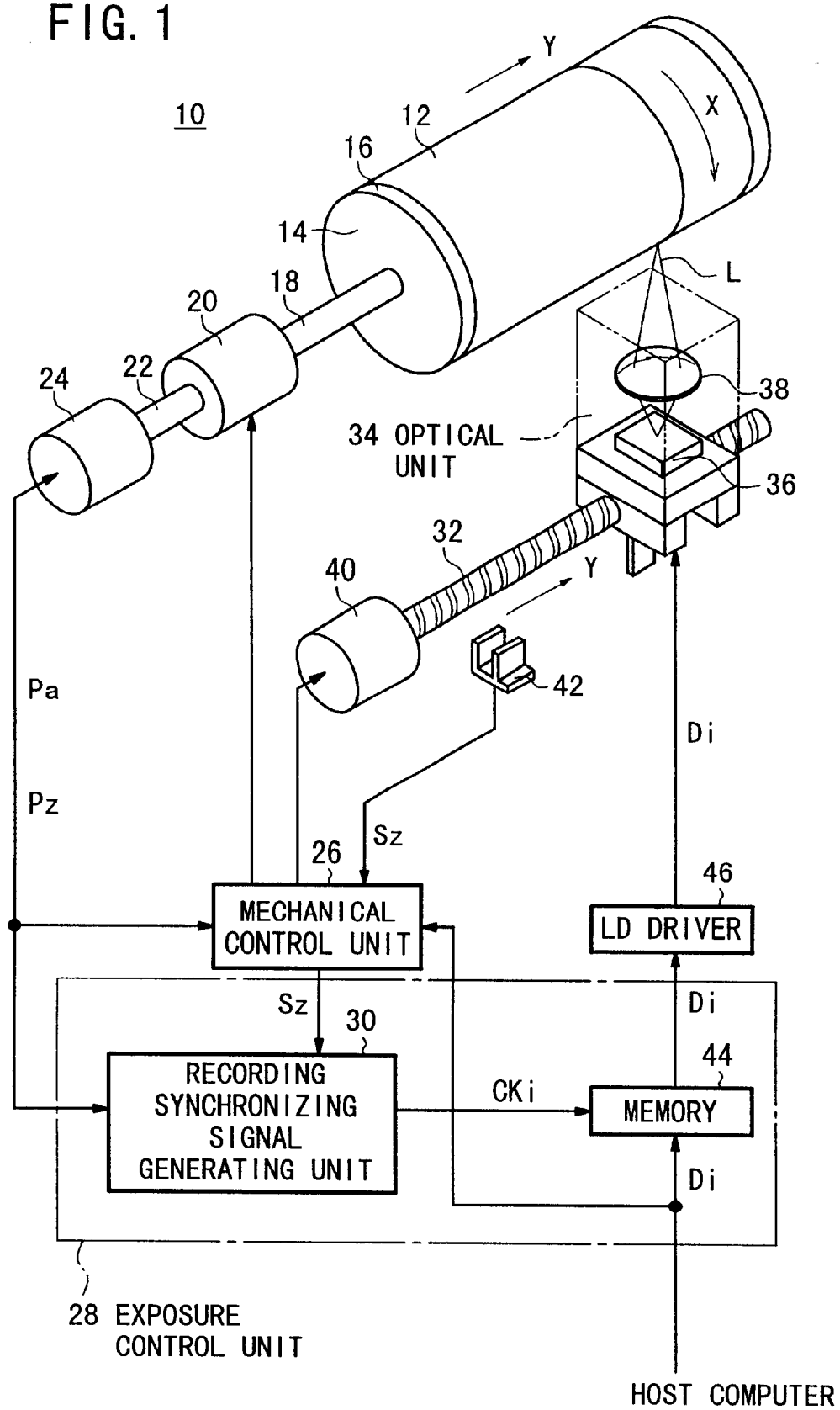
FIG. 1 is a perspective view, partly in block form, a light beam image recording apparatus according to an embodiment of the preset-invention.

FIG. 1 schematically shows a light beam image recording apparatus 10 according to an embodiment of the present invention.

As shown in FIG. 1, the light beam image recording apparatus has a drum 14. A presensitized (PS) plate or recording sheet 12 as a photosensitive medium for recording an image thereon is wounded on the outer circumferential surface 16 of the drum 14. The PS plate 12 is wound around the outer circumferential surface 16 of the drum 14 and held intimately against the outer circumferential surface 16 by a holder (not shown).

In this embodiment, the drum 14 comprises a cylindrical drum having a diameter of 300 mm and a length of 1 m and made of aluminum.

The drum 14 has an axial shaft 18 having one end connected to a main scanning motor 20 which comprises an AC servomotor as a drive source for rotating the drum 14 about its own axis at a constant speed in the main scanning direction indicated by the arrow X. The main scanning motor 20 has a shaft 22 extending remotely from and coaxially with the shaft 18 and coupled to a rotary encoder 24 which rotates in unison with the drum 14 and functions as a means for detecting a recording position in the main scanning direction X.

The rotary encoder 24 outputs A-phase pulses Pa and Z-phase pulses Pz representing detected recording position information in the main scanning direction X. The rotary encoder 24 outputs 5000 A-phase pulses Pa per revolution of the drum 14 and one Z-phase pulse Pz per revolution of the drum 14. Therefore, the rotary encoder 24 which outputs Z-phase pulses Pz also functions as a means for detecting information (origin information) per revolution of the drum 14.

A-phase pulses Pa and Z-phase pulses Pz outputted from the rotary encoder 24 are supplied to a mechanical control unit 26 as a means for controlling rotary drive sources, and also to a recording synchronizing signal generating unit 30 of an exposure control unit 28. The recording synchronizing signal generating unit 30 functions as a means for generating a recording synchronizing signal (pixel clock), and the exposure control unit 28 functions as an exposure control means. Each of the mechanical control unit 26 and the recording synchronizing signal generating unit 30 is implemented by a microcomputer including a CPU serving as a control means.

The light beam image recording apparatus 10 also has a ball screw 32 extending parallel to the shaft 18 and an optical unit 34 mounted on the ball screw 32 and a guide rail (not shown) parallel to the ball screw 32. The optical unit 34 provides an optical system functioning as an image recording means. The optical unit 34 comprises a laser diode 36 as a laser beam emitting means for generating a light beam L comprising a light beam, and a focusing optical system 38 for focusing the light beam L emitted from the laser diode 36 onto the PS plate 12 on the drum 14.

An auxiliary scanning motor 40 such as a stepping motor or the like is connected to an end of the ball screw 32 as a rotary drive source for rotating the ball screw 32 about its own axis to translate the optical unit 34 along the shaft 18 of the drum 14 in an auxiliary scanning direction indicated by the arrow Y.

An origin detector 42 for detecting an origin or home position of the optical unit 34 in the auxiliary scanning direction Y is fixedly positioned near the end of the drum 14 from which the shaft 18 projects. The origin detector 42 supplies a detected-origin signal Sz indicative of the detected origin or home position of the optical unit 34 in the auxiliary scanning direction Y to the mechanical control unit 26.

Based on an instruction signal from a host computer, the detected-origin signal Sz from the origin detector 42, A-phase pulses Pa, and Z-phase pulses Pz, the mechanical control unit 26 rotates the main scanning motor 20 at a constant speed. Each time the mechanical control unit 26 is supplied with a Z-phase pulse Pz, the mechanical control unit 26 rotates the auxiliary scanning motor 40 in one step to feed the optical unit 34 stepwise in the auxiliary scanning direction Y.

Basically, the exposure control unit 28 has the recording synchronizing signal generating unit 30 and a memory 44 functioning as an image data storage means which uses, as a reading signal, a pixel clock CKi that is a recording synchronizing signal supplied from the recording synchronizing signal generating unit 30.

The memory 44 stores image data Di, which comprises halftone dot image data to be recorded on the PS plate 12, supplied from the host computer.

The memory 44 outputs image data Di, which is binary gradation data of "0" or "1", read using the pixel clock CKi supplied from the recording synchronizing signal generating unit 30 as a reading address. The outputted image data Di is supplied to a laser diode drive circuit or LD driver 46 which functions as a drive means or optical system drive means for energizing the laser diode 36. The LD driver 46 supplies an on/off signal corresponding to the image data Di (the on/off signal is off when the image data Di is Di=0 and on when the image data Di is Di=1) to the laser diode 36.

The laser diode 36 emits a light beam L which is turned on or off depending on the supplied on/off signal. The light beam L is then applied via the focusing optical system 38 to the PS plate 12 thereby recording an image, i.e., a halftone dot image, on the PS plate 12 based on the image data Di while the PS plate 12 is being rotated in the main scanning direction X.

The light beam image recording apparatus 10 is basically constructed as described above.

General operation of the light beam image recording apparatus 10 will be described below.

In the light beam image recording apparatus 10 shown in FIG. 1, when the optical unit 34 is positioned at the origin in the auxiliary scanning direction Y, the mechanical control unit 26 rotates the main scanning motor 20 at a constant speed to rotate the drum 14 and hence the PS plate 12 mounted on the outer circumferential surface 16 of the drum 14. The constant-speed rotation of the main scanning motor 20 is achieved by the mechanical control unit 26 according to a feedback control process based on A-phase pulses Pa from the rotary encoder 24.

While the drum 14 is being rotated at a constant speed, the auxiliary scanning motor 40 is turned a predetermined angular interval each time a Z-phase pulse Pz is applied, thereby feeding the optical unit 34 stepwise in the auxiliary scanning direction Y. When the optical unit 34 is fed to its origin in the auxiliary scanning direction Y, the origin detector 42 generates and supplies a detected-origin signal Sz in the auxiliary scanning direction Y to the mechanical control unit 26.

The mechanical control unit 26 in turn supplies the detected-origin signal Sz to the recording synchronizing signal generating unit 30.

The recording synchronizing signal generating unit 30 supplies a pixel clock CKi generated from A-phase pulses Pa to the memory 44. Based on the pixel clock CKi, stored image data Di is read from the memory 44 and supplied to the LD driver 46, which energizes the optical unit 34. The optical unit 34 applies a light beam L which is selectively turned on and off as a recording beam to the PS plate 12.

With the light beam image recording apparatus 10 shown in FIG. 1, the light beam L emitted from the optical unit 34 and applied to the PS plate 12 mounted on the outer circumferential surface 16 of the drum 14 that is rotated at a constant speed by the main scanning motor 20 is selectively turned on and off while scanning the PS plate 12 in the main scanning direction X to record a linear image on the PS plate 12 along each main scanning line. At the same time, the optical unit 34 is moved in the auxiliary scanning direction Y by the auxiliary scanning motor 40 to record a two-dimensional image, i.e., halftone dot image, on the PS plate 12.

The light beam image recording apparatus 10 generally operates in the manner described above.

Figure 2:
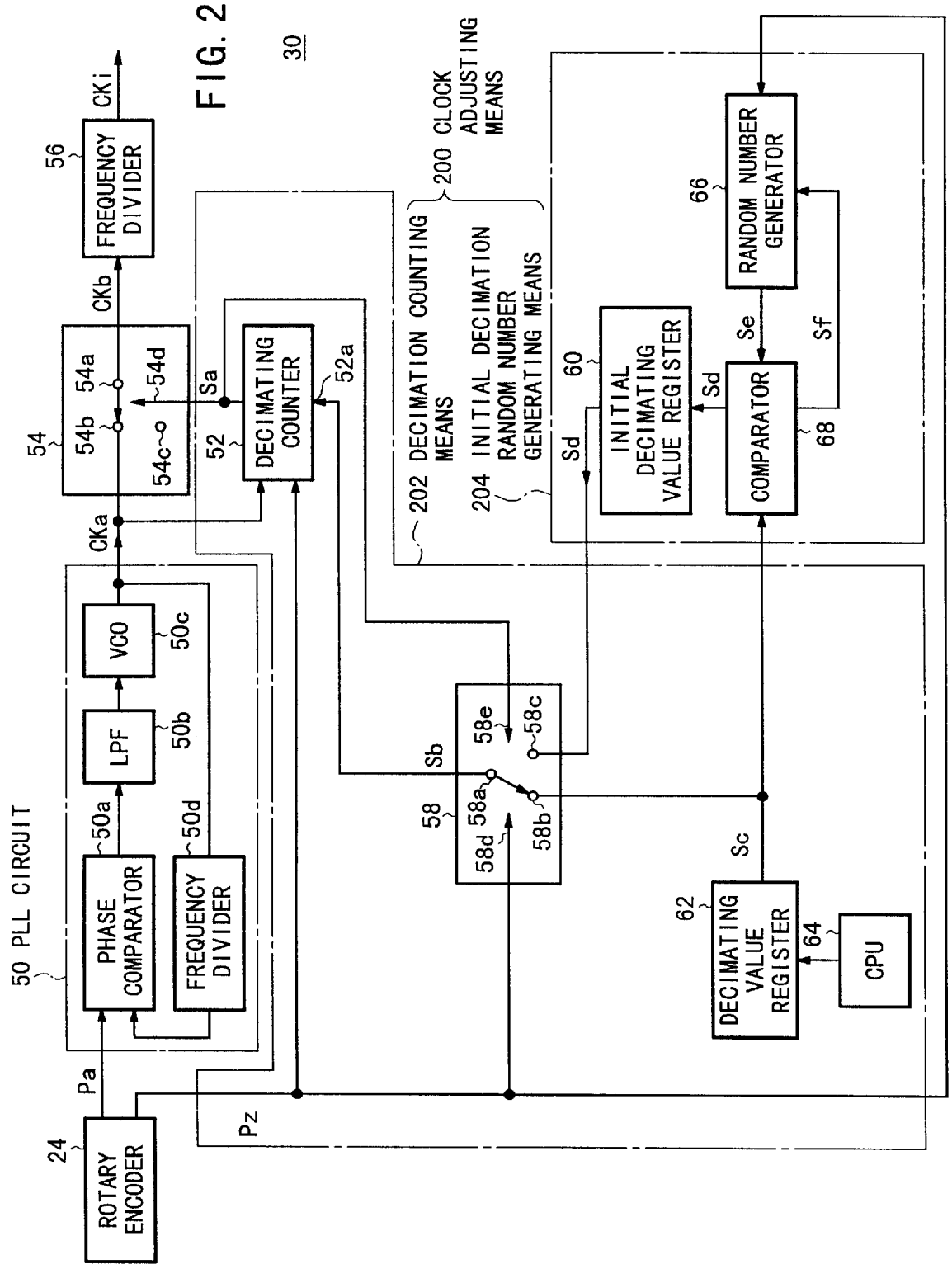
FIG. 2 a block diagram of a recording synchronizing signal generating unit in the light beam image recording apparatus shown in FIG. 1.

FIG. 2 shows in block form the recording synchronizing signal generating unit 30 functioning as a means for generating a pixel clock. As shown in FIG. 2, the recording synchronizing signal generating unit 30 has a phase-locked loop (PLL) circuit 50. The PLL circuit 50 includes a series-connected circuit which comprises a phase comparator 50a having an input terminal that is supplied with A-phase pulses Pa from the rotary encoder 24, a low-pass filter (LPF) 50b, and a voltage-controlled oscillator (VCO) 50c, and a frequency divider 50d for frequency-dividing an output from the voltage-controlled oscillator 50c and supplying a frequency-divided signal to the other input terminal of the phase comparator 50a. The PLL circuit 50 functions as an original clock generating means for generating an original clock CKa that comprises multiplied pulses (multiplied by 10) in synchronism with the A-phase pulses Pa.

The original clock CKa is supplied to a count input terminal of a decimating counter 52, which functions as a decimation counting means for counting pulses of the original clock CKa and outputting a decimating instruction Sa to decimate a pulse from the original clock CKa each time a preset count Sb is reached. The original clock CKa is also supplied to an input terminal 54b of a gate circuit 54, which functions as a decimating means for decimating a pulse from the original clock CKa and outputting a clock CKb from which the pulse has been decimated according to the decimating instruction Sa.

The clock CKb is supplied from an output terminal 54a of the gate circuit 54 to a frequency divider 56, which functions as a frequency-dividing means whose frequency-dividing ratio is fixed to "8", for example. The frequency divider 56 frequency-divides the clock CKb by 8, and outputs a pixel clock CKi for recording an image, i.e., outputs one pulse of the pixel clock CKi each time 8 pulses of the clock CKb are supplied to the frequency divider 56.

The decimating counter 52 comprises a preset down counter, and has a reset input terminal supplied with a Z-phase pulse Pz each time the drum 14 makes one revolution.

Z-phase pulses Pz are also supplied to a control terminal 58d of a switch 58. The switch 58 comprises one-circuit, two-contact switch having control terminals 58d, 58e, a common terminal 58a, and fixed terminals 58b, 58c.

When a Z-phase pulse Pz is supplied to the decimating counter 52, the decimating counter 52 resets, i.e., clears, the count of the original clock Cka, and starts counting pulses of the original clock Cka again. When a Z-phase pulse Pz is supplied to the control terminal 58d of the switch 58, the common terminal 58a of the switch 58 is temporarily connected to the fixed terminal 58c, allowing a first count Sd in each main scanning line from an initial decimating value register 60, which functions as an initial count setting means, to be supplied as a predetermined count Sb (Sb=Sd at this time) to a preset input terminal 52a of the decimating counter 52.

When pulses of the original clock CKa are counted to the first count Sd by the decimating counter 52, the decimating counter 52 outputs a counting end signal as the decimating instruction Sa to a control terminal 54d of the gate circuit 54, shifting the output terminal 54a to an unconnected terminal 54c for a period of time in which one pulse of the original clock CKa is decimated.

The counting end signal as the decimating instruction Sa is also supplied to the control terminal 58e of the switch 58, shifting the common terminal 58a from the fixed terminal 58c to the fixed terminal 58b to allow a second and subsequent count Sc, e.g., Sc=72, which has been set in a decimating value register 62 by a CPU 64, e.g., a one-chip CPU such as a microcomputer, to be set as the preset count Sb in the input terminal 52a of the decimating counter 52 (Sb=Sc).

A random number Se which is equal to or smaller than the second and subsequent count Sc is set as a first count Sd in each main scanning line in the initial decimating value register 60.

If a random number Se generated by a random number generator 66 that is initiated by a Z-phase pulse Pz or a disagreement output Sf from a comparator 68 is equal to or smaller than the count Sc set in the decimating value register 62 (Se ≦Sc), then the random number Se is set as the first count Sd in the initial decimating value register 60. If the random number Se is in excess of the count Sc set in the decimating value register 62, then a random number Se is generated again by the random number generator 66 based on the disagreement output Sf from the comparator 68 until the random number Se becomes equal to or smaller than the count Sc.

The recording synchronizing signal generating unit 30 shown in FIG. 2 may be considered as having a clock adjusting means 200 for adjusting the pixel clock CKi which comprises a decimation counting means 202 and an initial decimation random number generating means 204. The decimation counting means 202 comprises the decimating counter 52, the switch 58, the decimating value register 62, and the CPU 64, and the initial decimation random number generating means 204 comprises the initial decimating value register 60, the random number generator 66, and the comparator 68.

The light beam image recording apparatus 10 shown in FIG. 1 which has the recording synchronizing signal generating unit 30 shown in FIG. 2 operates and offers advantages as follows:

The rotary encoder 24 detects, as A-phase pulses Pa, the information of recording position in the main scanning direction X on the PS plate 12 by the optical unit 34. Based on the A-phase pulses Pa, the PLL circuit 50 generates an original clock CKa by multiplying the frequency of the A-phase pulses Pa.

The decimating counter 52 counts pulses of the original clock CKa, and outputs a decimating instruction Sa to decimate one pulse from the original clock CKa each time the count of the decimating counter 52 reaches a predetermined count or decimating value Sc (Sc=72).

Based on the decimating instruction Sa, the gate circuit 54 produces a clock CKb by decimating one pulse from the original clock CKa. The frequency divider 56 then frequency-divides the clock CKb at a fixed frequency-dividing ratio of 8, producing and outputting a pixel clock CKi for recording an image.

Since the recording frequency of the pixel clock CKi is varied by decimating the original clock CKa based on the decimating value Sc as a predetermined count, the image recorded on the PS plate 12 can be rendered finely and accurately by determining in advance the decimating value Sc depending on the positional relationship between the PS plate 12 and the optical unit 34.

In FIGS. 1 and 2, the image recorded on the PS plate 12 by the light beam L comprises a halftone dot image that is produced based on the presence or absence of pixels, i.e., the turning on or off of the light beam L.

The recording sheet may be a photosensitive medium such as a photosensitive film or the like other than the PS plate 12. If the optical unit 34 is replaced with an ink ejecting unit, then the recording sheet may be a sheet of paper.

The optical unit 34 used as the image recording means allows pixels having a diameter of 10 $\mu$m or less to be produced with the light beam L emitted thereby. The PS plate 12. used as the recording sheet allows the light beam image recording apparatus 10 to be constructed as a CTP (Computer To Plate) apparatus.

In the embodiment shown in FIGS. 1 and 2, the light beam image recording apparatus 10 is constructed as an external surface scanning light beam image recording apparatus in which the PS plate 12 mounted on the outer circumferential surface 16 of the drum 14 rotated by the main scanning motor 20 is scanned in the main scanning direction X by the light beam L emitted from the optical unit 34 to record a linear image on the PS plate along each main scanning line, and the optical unit 34 is moved in the auxiliary scanning direction Y along the shaft 18 of the drum 14 by the auxiliary scanning motor 40 to record a two-dimensional image on the PS plate 12. The image recorded on the PS plate 12 can maintain a desired level of dimensional accuracy irrespective of variations of the diameter of the drum 14.

Figure 3:
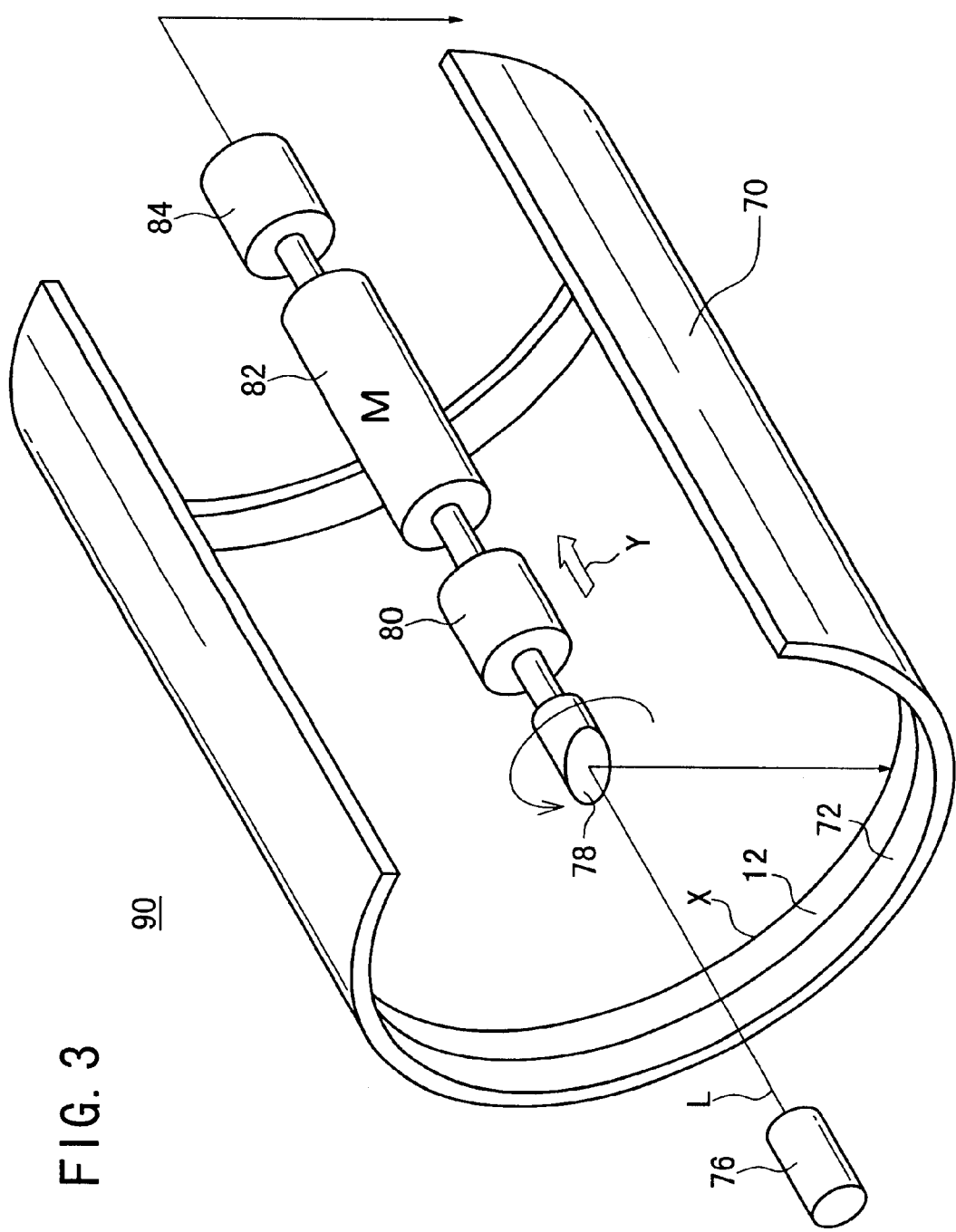
FIG. 3 is a perspective view of an internal scanning type light beam image recording apparatus according to another embodiment of the present invention.

FIG. 3 shows an internal scanning type light beam image recording apparatus 90 according to another embodiment of the present invention.

As shown in FIG. 3, the internal scanning type light beam image recording apparatus 90 has a cylindrical drum 70 with a PS plate 12 as a recording sheet mounted on an inner circumferential surface 72 thereof, an optical unit 76 comprising a laser beam source for emitting a light beam L along the central axis of the drum 70, a spinner 80 disposed on the central axis of the drum 70 and having a reflecting mirror surface 78 inclined at an angle of 45° to the axis of the light beam L, a main scanning motor 82 for rotating the spinner 80 about the central axis of the drum 70 at a high constant speed for scanning the PS plate 12 in a main scanning direction X to record a linear image on the PS plate along each main scanning line, and an auxiliary scanning system (not shown) for moving the spinner 80 in an auxiliary scanning direction Y along the central axis of the drum 70 to record a two-dimensional image on the PS plate 12.

The exposure control unit 28 shown in FIG. 1 is incorporated in the internal scanning type light beam image recording apparatus 90 shown in FIG. 3 to record an image on the PS plate 12 with a desired level of dimensional accuracy irrespective of variations of the diameter of the drum 70.

The external surface scanning light beam image recording apparatus shown in FIG. 1 also has a rotary encoder 24 for outputting a Z-phase pulse Pz each time the drum 14 makes one revolution, the rotary encoder 24 functioning as a means for detecting information (origin information) per revolution of the drum 14.

Further, the internal scanning type light beam image recording apparatus 90 shown in FIG. 3 also has a rotary encoder 84 for outputting a Z-phase pulse Pz each time the spinner 80 makes one revolution, the rotary encoder 84 functioning as a means for detecting information (origin information) per revolution of the spinner 80.

In each of the embodiments shown in FIGS. 1, 2 and FIG. 3, when the decimating counter 52 detects a Z-phase pulse Pz, the decimating counter 52 is reset to clear the count of the original clock CKa thereby, and thereafter starts to count the original clock CKa up to the predetermined count Sd. Therefore, the first correcting value, i.e., the count Sd, can be varied for each main scanning line thereby to facilitate a fine correcting process.

After the decimating counter 52 is reset by a Z-phase pulse Pz and until it generates a decimating instruction Sa, the decimating counter 52 is set to the count Sd corresponding to the random number Se generated by the random number generator 66 as a first count Sb for counting the original clock CKa. After the decimating counter 52 is reset by a Z-phase pulse Pz and until it generates a second and subsequent decimating instruction Sa, the decimating counter 52 is set to the preset count Sc as a second and subsequent count Sb for counting the original clock CKa.

The gate circuit 54 is closed, i.e., its switch is opened, for the period of one pulse each time a decimating instruction Sa is produced as a counting end signal by the decimating counter 52. Since the interval after the decimating counter 52 is reset by a Z-phase pulse Pz and until it subsequently generates a first decimating instruction Sa depends on the count Sd, which is of a value equal to or smaller than the count Sc and equal to the random number Se, corresponding to the random number Se, pixel clock positions are prevented from being corrected in fixed positions along the main scanning direction at all times, so that an image produced on the PS plate 12 does not suffer a quality degradation such as a striped irregularity or a moiré pattern.

Setting the first count Sd of the original clock CKa after the decimating counter 52 has been reset to a value between a value of 0 and the preset count Sc (Sc=72) with the comparator 68 offers such advantages that the random number generator 66 is simple in structure and all corrected positions are prevented from being displaced largely, i.e., more than the count Sc.

Figure 4:
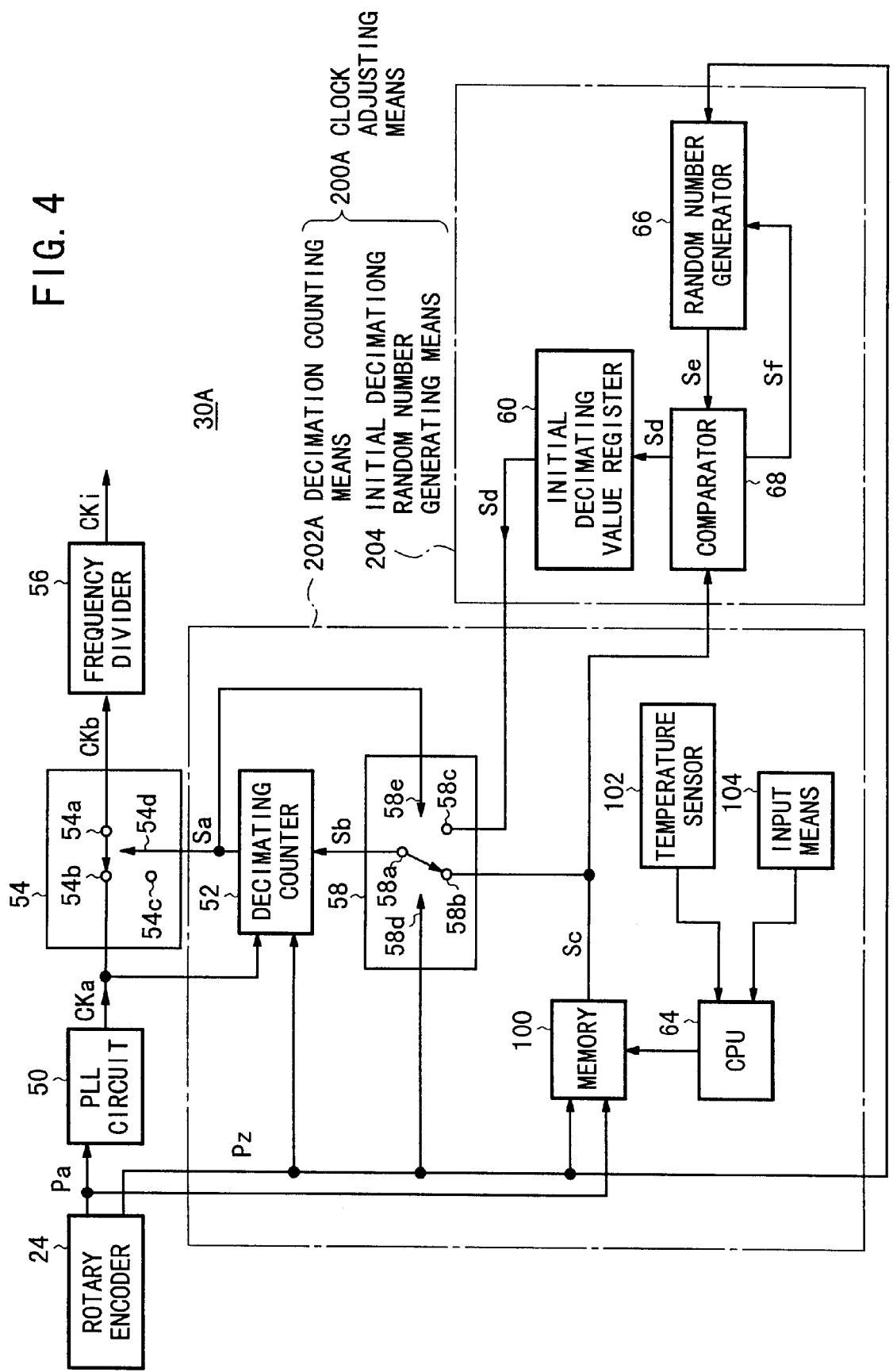
FIG. 4 is a block diagram of another recording synchronizing signal generating unit for use in the light beam image recording apparatus.

FIG. 4 shows another recording synchronizing signal generating unit 30A for use in the light beam image recording apparatus, which is capable of determining the count Sc set by the CPU 64 depending on the outside diameter of the drum 14, or the inside diameter of the drum 70, or the temperature of the light beam image recording apparatus 10, or the temperature of the internal scanning type light beam image recording apparatus 90, or the thickness of the PS plate 12 that may be of 0.2 mm, 0.24 mm, or 0.3 mm.

As shown in FIG. 4, the recording synchronizing signal generating unit 30A is similar to the recording synchronizing signal generating unit 30 shown in FIG. 2, except that it has a correcting data memory 100 instead of the decimating value register 62 shown in FIG. 2, and additionally includes a temperature sensor 102 connected to the CPU 64 for measuring or detecting the temperature of the light beam image recording apparatus, and a input means 104 such as a keyboard or the like connected to the CPU 64 for entering the thickness of the PS plate 12.

The correcting data memory 100 is supplied with Z-phase pulses Pz and A-phase pulses Pa as memory address data.

The recording synchronizing signal generating unit 30A shown in FIG. 4 has a clock adjusting means 200A for adjusting the pixel clock CKi which comprises a decimation counting means 202A and an initial decimation random number generating means 204. The clock adjusting means 200A comprises the decimating counter 52, the switch 58, the CPU 64, the correcting data memory 100, the temperature sensor 102, and the input means 104, and the initial decimation random number generating means 204 comprises the initial decimating value register 60, the random number generator 66, and the comparator 68.

Figure 5:
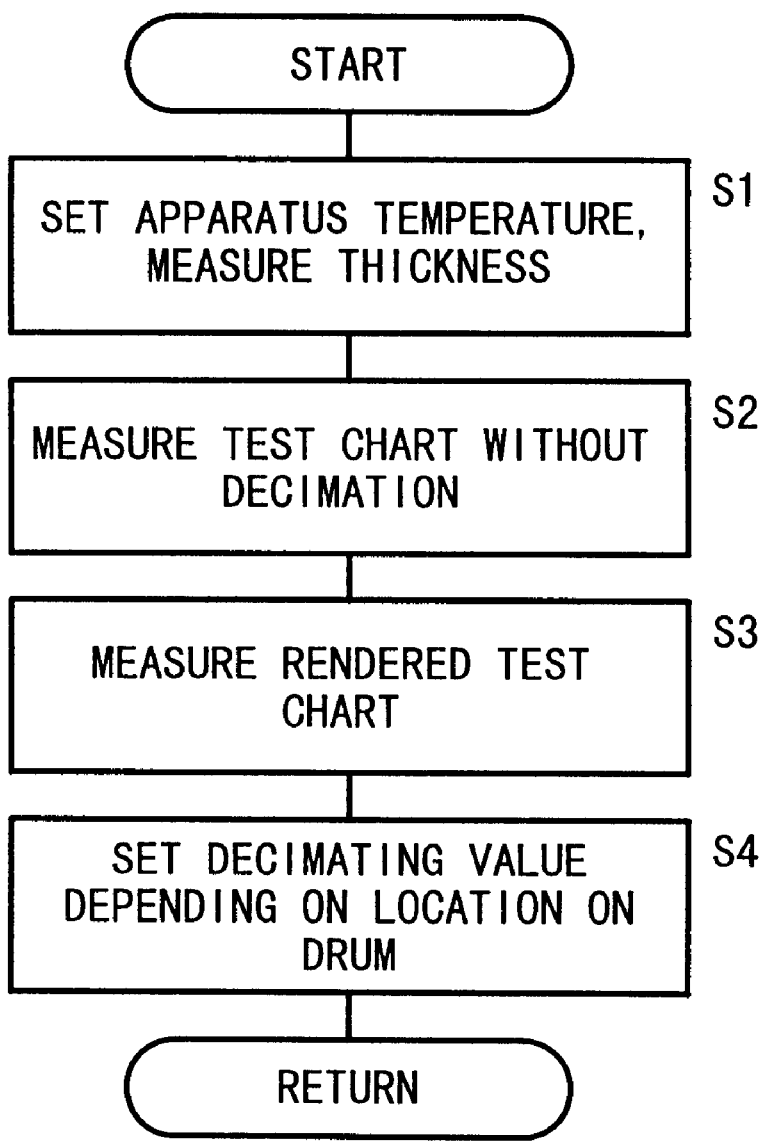
FIG. 5 is a flowchart of an operation sequence of the recording synchronizing signal generating unit shown in FIG. 4.

FIG. 5 shows a process of generating correcting data which is to be stored in advance in the correcting data memory 100 of the recording synchronizing signal generating unit 30A.

In step S1 shown in FIG. 5, with the PS plate 12, whose thickness has been measured, being mounted on the outer circumferential surface 16 of the drum 14, the temperature of the light beam image recording apparatus 10 that is placed in a constant-temperature chamber is measured by the temperature sensor 102. The thickness of the PS plate 12 is entered into the CPU 64 via the input means 104.

Figure 6:
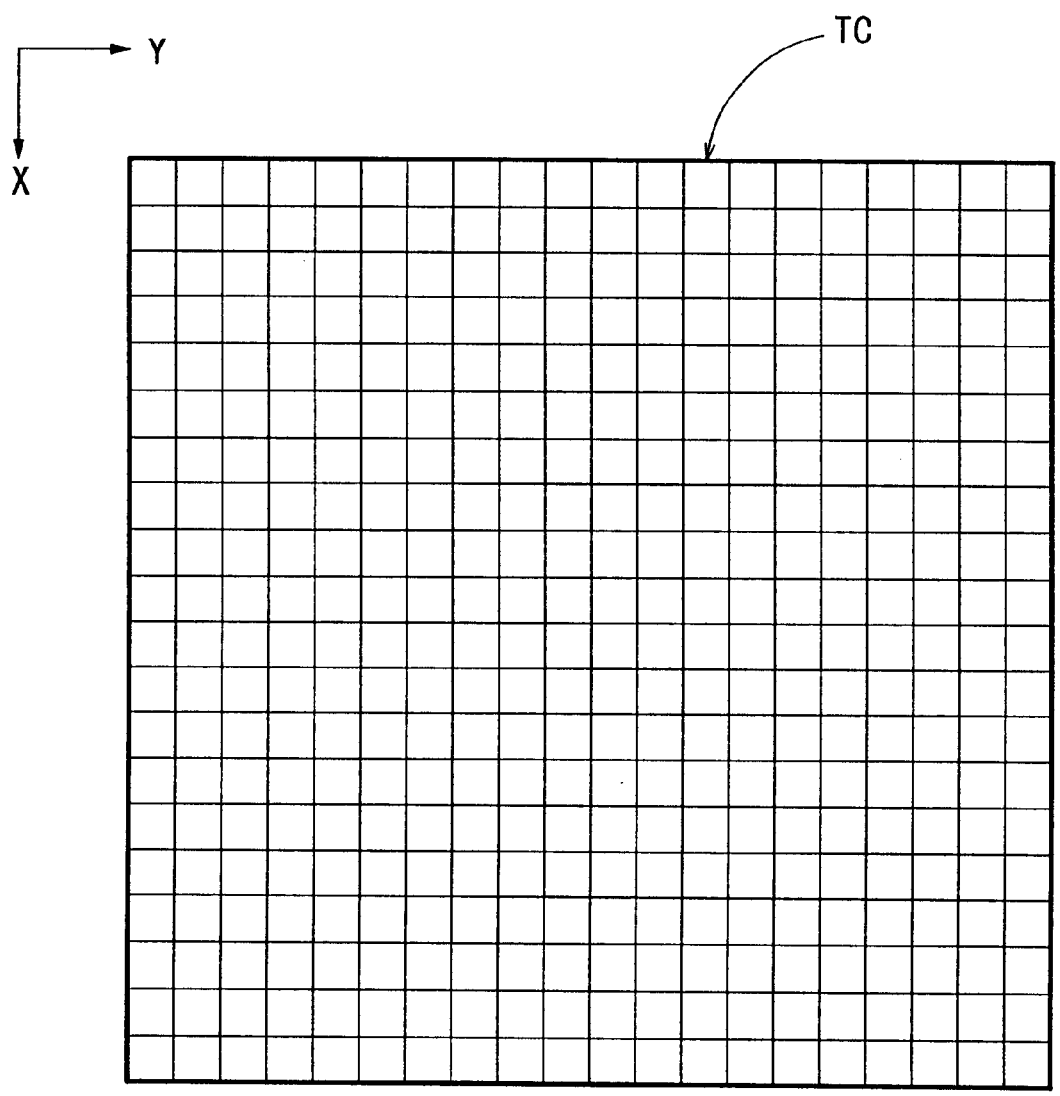
FIG. 6 is a front elevational view of a test chart.

In step S2, without the decimating counter 52 operating, i.e., with the gate circuit 54 being closed as shown in FIG. 4, the drum 14 is rotated at a constant speed, and image data for generating a reference test chart TC shown in FIG. 6 is stored in the memory 44 (see FIG. 1) and used to record an image corresponding to the reference test chart TC entirely on the PS plate 12.

In step S3, the PS plate 12 on which the image corresponding to the reference test chart TC (hereinafter referred to as "recorded test chart TC1") is removed from the drum 14, and the status of the recorded test chart TC1, i.e., the recorded test chart TC1 which is suffering a distortion, on the PS plate 12 is measured by a measuring means (not shown).

In step S4, the difference between the measured recorded test chart TC1 and the reference test chart TC is calculated, and a decimating value Sc on the drum 14, i.e., the number of pulses of the original clock CKa which are to be counted before one pulse is decimated, is calculated in order to eliminate the difference and stored in the correcting data memory 100 (see FIG. 4). The decimating value Sc may be set to a different value each time the drum 14 makes one revolution in the main scanning direction X, and also may be set to a different value during one revolution of the drum 14.

If one pixel has a size of 10 μm, then when the decimating value Sc is set to Sc=72, the decimating process is performed once in 0.72 mm.

The processing in steps S1–S4 is carried out for each of different temperature settings, each of different thicknesses of the PS plate 12, and each of different diameters of the drums 14, 70, thereby producing correcting decimating value data. The produced correcting decimating value data are then stored in the correcting data memory 100.

By thus determining the count Sc set in the decimating value register 62 by the CPU 64 depending on the outside diameter of the drum 14, or the inside diameter of the drum 70, or the temperature of the light beam image recording apparatus 10, or the temperature of the internal scanning type light beam image recording apparatus 90, or the thickness of the PS plate 12, images to be recorded can accurately be corrected with respect to such various parameters.

Figure 7:
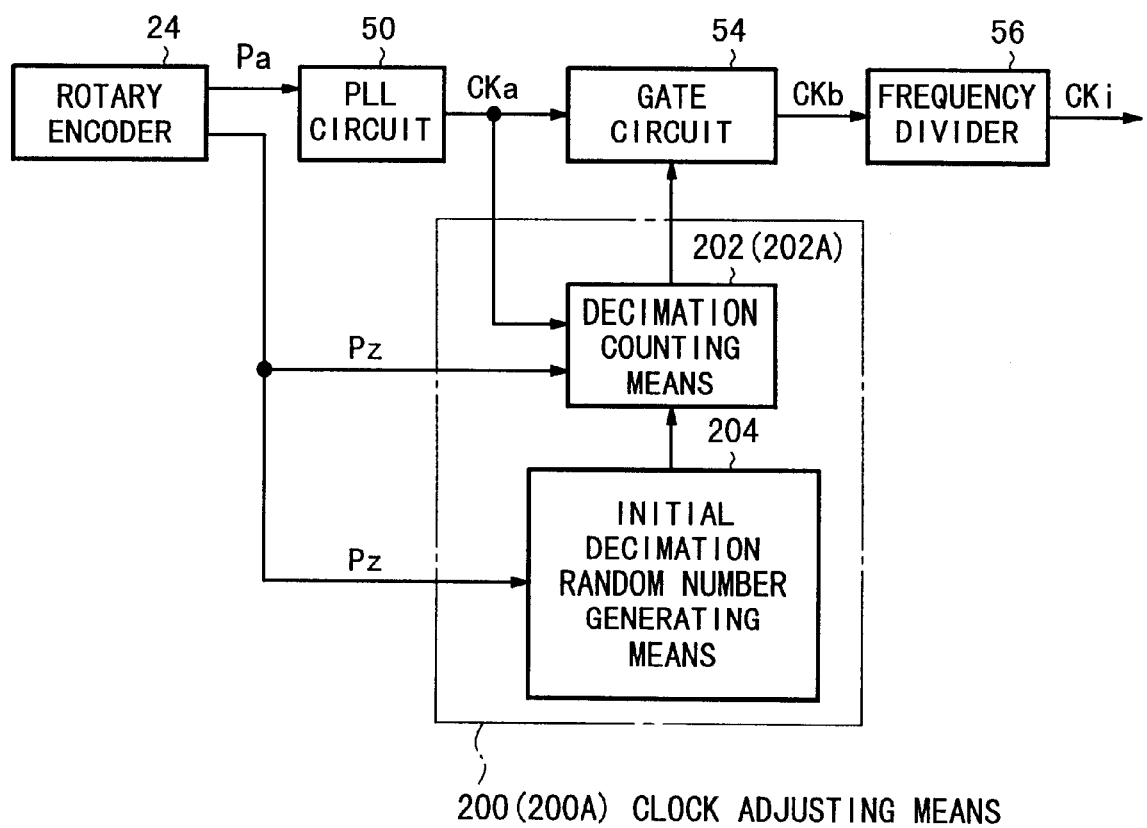
FIG. 7 is a simplified block diagram of the recording synchronizing signal generating units.

The feature of the above embodiments of the present invention and the technique disclosed in Japanese laid-open patent publication No. 10-16290 will be described for compa rison with reference to FIGS. 7 and 13. FIG. 7 shows each of the recording synchronizing signal generating units according to the above embodiments in simplified block form.

Figure 13:
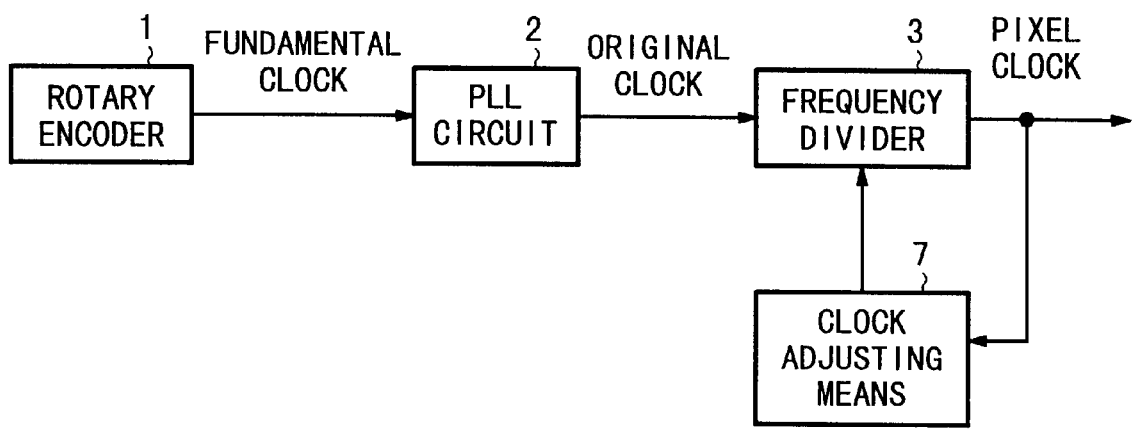
FIG. 13 is a block diagram of a conventional system.
Figure 14:
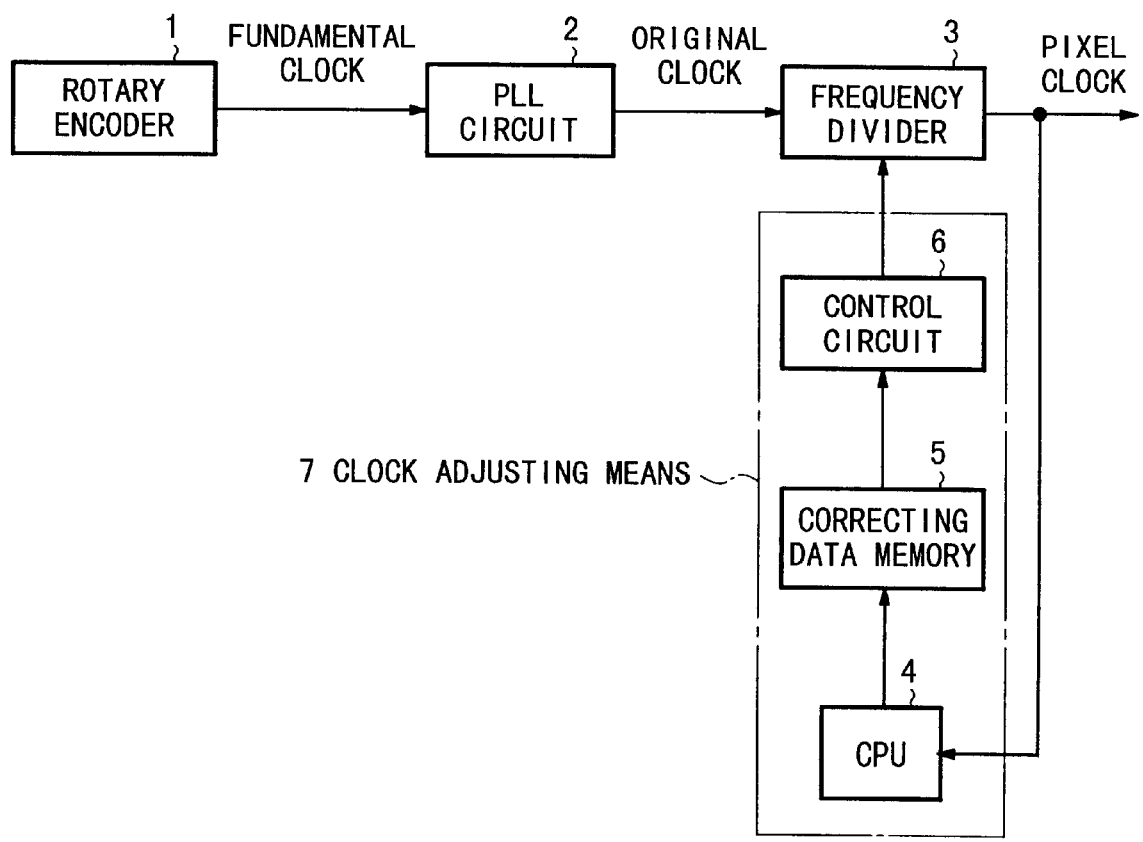
FIG. 14 is a detailed block diagram of the conventional system shown in FIG. 13.

In the conventional system shown in FIG. 13, the frequency of a fundamental clock supplied from the rotary encoder 1 is multiplied to produce an original clock by the PLL circuit 2. The frequency of the original clock is then divided by the frequency divider 3, whose frequency-dividing ratio is set to "7", "8", or "9" by the clock adjusting means 7 based on information of variations of the diameter of the drum, thus producing a pixel clock. However, since the corrective value of the frequency-dividing ratio is limited to "7", "8", or "9", the ability of the conventional system to deal with small variations of the drum diameter is low.

In the recording synchronizing signal generating unit shown in FIG. 7, the frequency-multiplying number of the PLL circuit 50 is set to the sufficiently large number of pulses determined from a resolution to be corrected relative to the pixel clock CKi, e.g., about 10 μm if the resolution with which to record an image on the PS plate 12 is 2400 DPI (dots per inch), and is decimated based on the decimating value Sc and the initial decimating value Sd by the clock adjusting means 200 (200A).

According to the foregoing process, the recording synchronizing signal generating unit shown in FIG. 7 is capable of controlling the position of a recording pixel in the main scanning direction X with a simple arrangement. Therefore, the recording synchronizing signal generating unit shown in FIG. 7 has a higher ability to deal with small variations of the drum diameter, or stated otherwise, is capable of correcting the resolution with simple instructions.

Specifically, if the drum diameter slightly changes from a 72/72 magnification (1 magnification) to a 73/72 magnification, then the conventional system needs to change the frequency-dividing ratio from a correcting pattern of "8, 8, 8, 8, 8, 8, 8, 8, 8"(72) to "9, 8, 8, 8, 8, 8, 8, 8, 8"(73). However, the recording synchronizing signal generating unit shown in FIG. 7 can deal with such a small variation of the drum diameter simply by changing the decimating value Sc stored in the decimating value register 62 from 72 to 73.

As described above, the recording synchronizing signal generating unit shown in FIG. 7 provides a wider correcting range with a simple arrangement than the conventional system shown in FIG. 13.

In the conventional system shown in FIG. 13, the original clock outputted from the PLL circuit 2, whose frequency is 8 times the frequency of the pixel clock, is used as a reference clock and usually frequency-divided by 8 and partly frequency-divided by 7 or 9 by the counter or frequency divider 3, for the correction of pixel clock positions. Therefore, pixel clock positions are corrected in fixed positions along the main scanning direction at all times, so that an image produced on the photosensitive medium such as the PS plate tends to suffer a quality degradation such as a striped irregularity or a moiré pattern. In the recording synchronizing signal generating unit shown in FIG. 7, however, since the initial decimating value Sd is a random number, a quality degradation such as a striped irregularity or a moiré pattern due to optical conflict with a halftone screen is prevented as much as possible.

Figure 8:
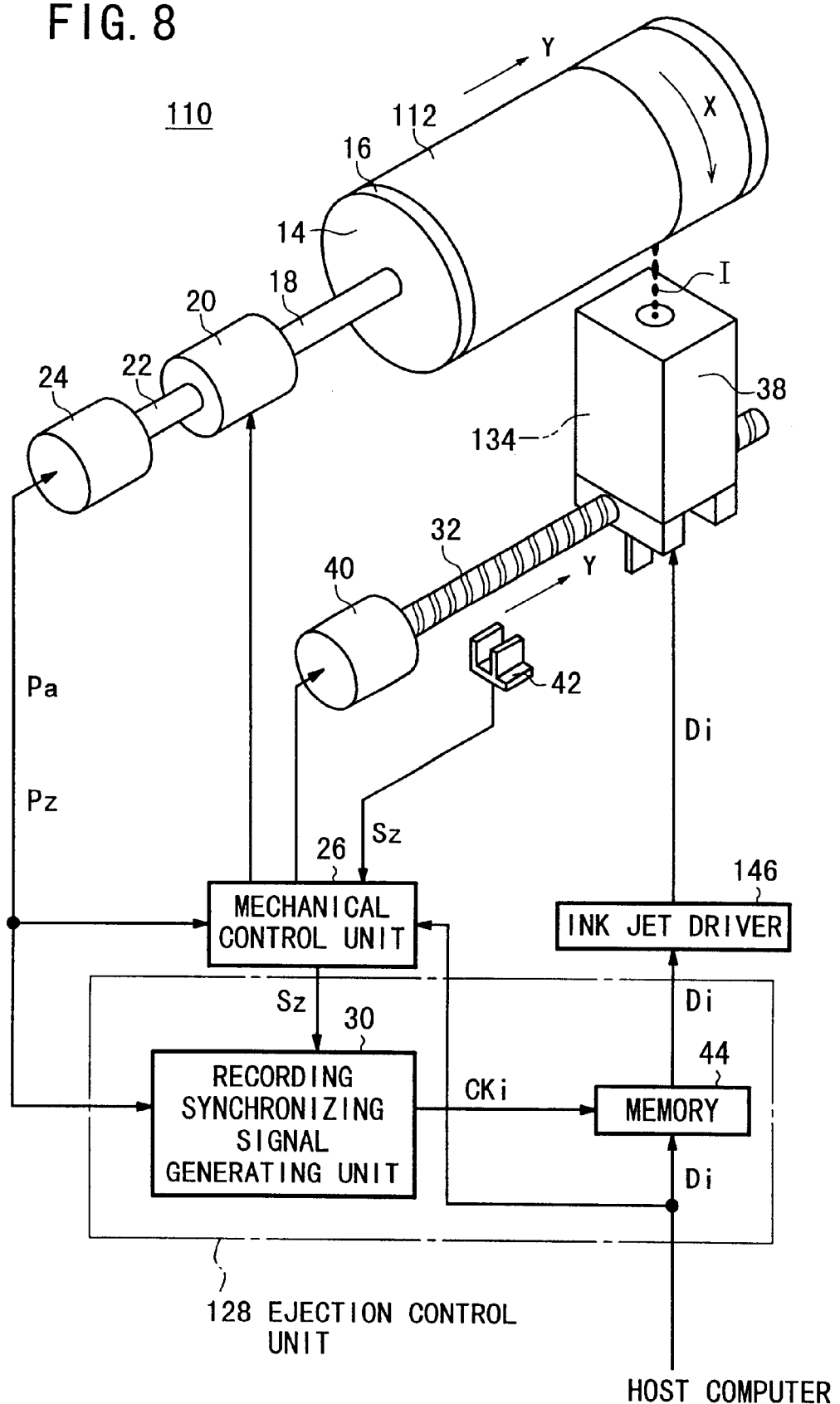
FIG. 8 is a perspective view, partly in block form, an external scanning type ink jet image recording apparatus according to still another embodiment of the present invention.

The principles of the light beam image recording apparatus 10 shown in FIG. 1 are also applicable to an external scanning type ink jet image recording apparatus 110 shown in FIG. 8 by replacing the exposure control unit 28, the LD driver 46, and the optical unit 34 of the light beam image recording apparatus 10 shown in FIG. 1 respectively with an ejection control unit 128, an ink jet driver 146, and an ink jet head 134 shown in FIG. 8. The external scanning type ink jet image recording apparatus 110 can directly be used as a printing press such as an offset printing press.

If the external scanning type ink jet image recording apparatus 110 is used as a printing press, then a recording sheet 112 such as an aluminum plate whose surface has been treated to attain a hydrophilic nature is mounted on the drum 14 that is used as a plate cylinder. Then, the ink jet head 134 ejects a lipophilic ink I based on the image data Di to the recording sheet 112 on the drum 14 as it rotates in the main scanning direction X to form a linear image along each main scanning line. At the same time, the ink jet head 134 is moved in the auxiliary scanning direction Y to record a two-dimensional image, which is composed of areas where the lipophilic ink I is applied and areas where the lipophilic ink I is not applied, on the recording sheet 112.

In this manner, a halftone dot image is formed of the applied areas of the lipophilic ink I on the hydrophilic recording sheet 112.

For printing the image, damping water is applied to the recording sheet 112 by a water roller (not shown), and then a printing ink is applied to the recording sheet 112 by a printing ink roller (not shown). The printing ink is attached to only the halftone dot image of the applied areas of the lipophilic ink I. The applied printing ink is then transferred to a printing sheet of paper, thus producing a printed material with the halftone dot image.

The external scanning type ink jet image recording apparatus 110 is advantageous in that it requires no developing and fixing process for developing and fixing the recorded image.

As described above, the present invention is applicable to various image recording apparatus which need to make corrections with respect to the drum system such as light beam image recording apparatus and ink jet image recording apparatus.

As described above, since the recording frequency is varied by decimating pulses of the original clock at locations where need to be corrected, such corrections can be made stably with a simple arrangement against a distortion of an image, such as an expansion or a contraction, due to an error of a mechanical system for holding a recording sheet, e.g., a drum or the like.

In this fashion, a more accurate image can be recorded on and reproduced from a recording sheet.

Inasmuch as the first decimated position in the main scanning direction is determined by a random number, the image recording apparatus does not produce a quality degradation such as a striped irregularity or a moiré pattern in the image recorded on the recording sheet.

Figure 9:
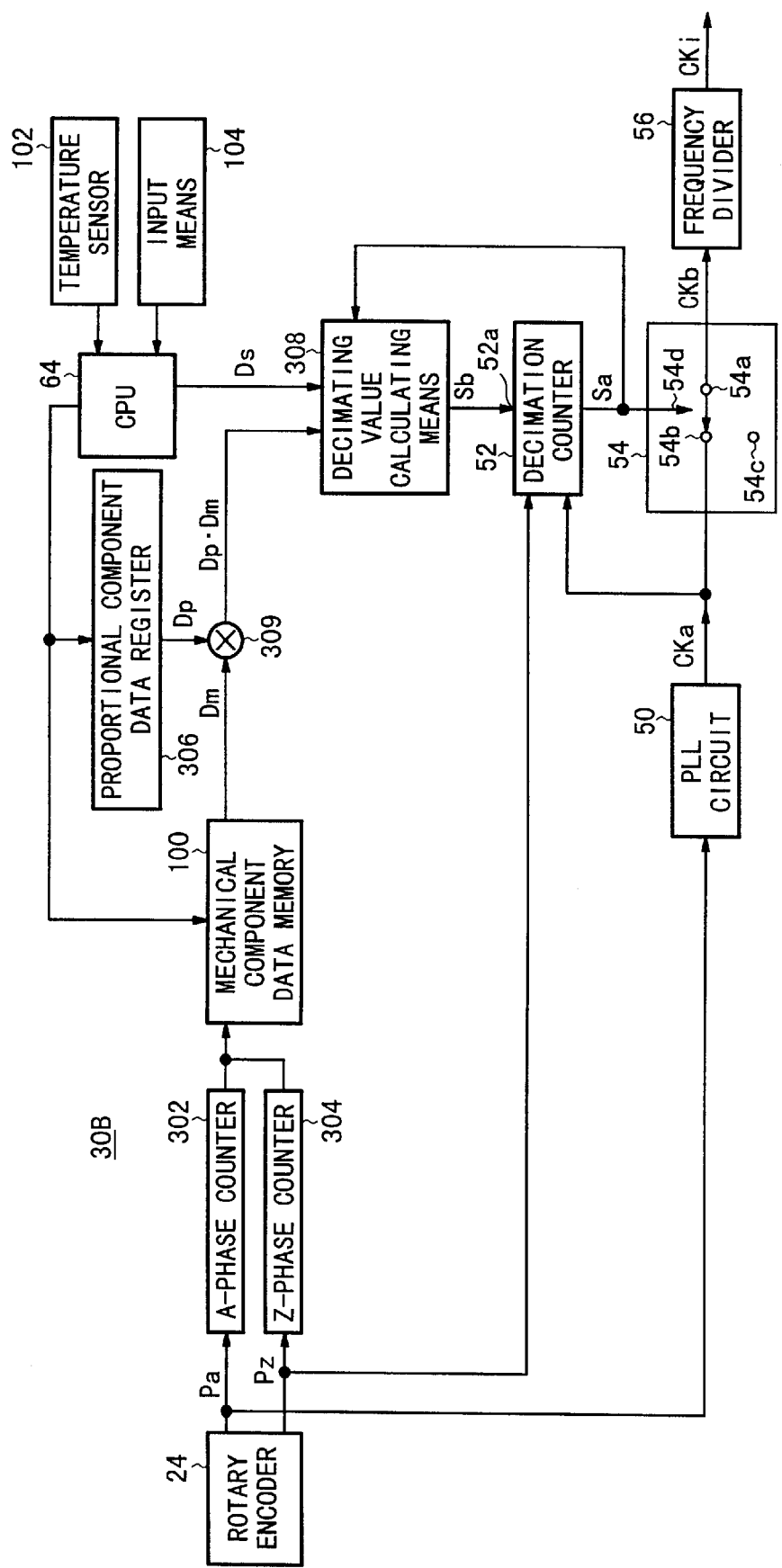
FIG. 9 is a block diagram of still another recording synchronizing signal generating unit for use in the light beam image recording apparatus.

FIG. 9 shows in block form still another recording synchronizing signal generating unit 30B, which functions as a pixel clock generating means, for use in the light beam image recording apparatus.

Those parts of the recording synchronizing signal generating unit 30B which are identical to those shown in FIGS. 1 through 8 are denoted by identical reference characters, and will not be described in detail below.

As shown in FIG. 9, the recording synchronizing signal generating unit 30B has a PLL circuit 50 functioning as an original clock generating means for generating an original clock CKa that comprises multiplied pulses (multiplied by 10) in synchronism with the A-phase pulses Pa.

The original clock CKa is supplied to a count input terminal of a decimating counter 52, which functions as a decimation counting means for counting pulses of the original clock CKa and outputting a decimating instruction Sa to decimate a pulse from the original clock CKa each time a preset count Sb is reached. The original clock CKa is also supplied to an input terminal 54b of a gate circuit 54, which functions as a decimating means for decimating a pulse from the original clock CKa and outputting a clock CKb from which the pulse has been decimated according to the decimating instruction Sa.

The clock CKb is supplied from an output terminal 54a of the gate circuit 54 to a frequency divider 56, which functions as a frequency-dividing means whose frequency-dividing ratio is fixed to "8", for example. The frequency divider 56 frequency-divides the clock CKb by 8, and outputs a pixel clock CKi for recording an image, i.e., outputs one pulse of the pixel clock CKi each time 8 pulses of the clock CKb are supplied to the frequency divider 56.

The decimating counter 52 comprises a preset down counter, and has a reset input terminal supplied with a Z-phase pulse Pz each time the drum 14 makes one revolution.

When a Z-phase pulse Pz is supplied to the decimating counter 52, the decimating counter 52 resets, i.e., clears, the count of the original clock Cka, and starts counting pulses of the original clock Cka again.

The decimating counter 52 has a preset input terminal 52a which is supplied with a count Sb calculated by a decimating value calculating means 308.

When pulses of the original clock CKa are counted to the count Sb by the decimating counter 52, the decimating counter 52 outputs a counting end signal as the decimating instruction Sa to a control terminal 54d of the gate circuit 54, shifting the output terminal 54a to an unconnected terminal 54c for a period of time in which one pulse of the original clock CKa is decimated.

When the counting end signal as the decimating instruction Sa is supplied to the decimating value calculating means 308, the decimating value calculating means 308 supplies a new count Sb to the decimating counter 52.

A mechanical component data memory 100 as a storage means stores mechanical component correcting data Dm, and a proportional component data register 306 stores proportional component correcting data Dp. The mechanical component correcting data Dm outputted from the mechanical component data memory 100 and the proportional component correcting data Dp outputted from the proportional component data register 306 are combined into a combined correcting value (multiplied value) Dp·Dm by a combining means 309. The combined correcting value Dp·Dm is supplied to the decimating value calculating means 308. The decimating value calculating means 308 refers to the combined correcting value Dp·Dm and a reference value Ds, e.g., Ds=72, and calculates the count Sb as a decimating value.

By standardizing central values of the mechanical component correcting data Dm and the proportional component correcting data Dp to a value of "1", the count Sb can be calculated as Sb=[Ds×Dp·Dm] (the special function [x] which is a mathematical symbol means the integral part of x).

If one pixel has a size of 10 μm, then when the decimating value Sc is set to Sc=72, the decimating process is performed once in 0.72 mm.

The mechanical component data memory 100 stores two-dimensional mechanical component correcting data, which have been standardized, in the main and auxiliary scanning directions X, Y, including parts and assembling tolerances based on the relative positional relationship between the outer circumferential surface 16 of the drum 14 and the optical unit 34. The two-dimensional mechanical component correcting data are supplied via the input means 104 and the CPU 64 to the mechanical component data memory 100.

A-phase counter 302, functioning as a counting means, counts A-phase pulses Pa outputted from the rotary encoder 24, and a Z-phase counter 304, functioning as a counting means, counts Z-phase pulses Pz from the rotary encoder 24. The mechanical component data memory 100 outputs mechanical component correcting data Dm at an address indicated by the count outputs from the A-phase counter 302 and the Z-phase counter 304.

The proportional component correcting data Dp stored in the proportional component data register 306 are set by the CPU 64 based on the resolution (dpi: dots per inch) of pixels recorded on the PS plate 12 by the light beam L, the thickness of the PS plate 12 that may be of 0.2 mm, 0.24 mm, or 0.3 mm, and the temperature or humidity in the light beam image recording apparatus 10, and are represented by proportionality constants.

For recording an image on the PS plate 12, the CPU 64 determines a proportionality constant based on the temperature information in the apparatus 10 from the temperature sensor 102 and thickness and resolution information of the PS plate 12 which is entered by the operator via the input means 104, and stores the determined proportionality constant as proportional component correcting data Dp in the proportional component data register 306. The resolution information may be entered from a RIP (Raster Image Processor), not shown. The CPU 64 may determine a proportionality constant based on at least one of the temperature information, the thickness information, and the resolution information, and store the determined proportionality constant as proportional component correcting data Dp in the proportional component data register 306.

Figure 10:
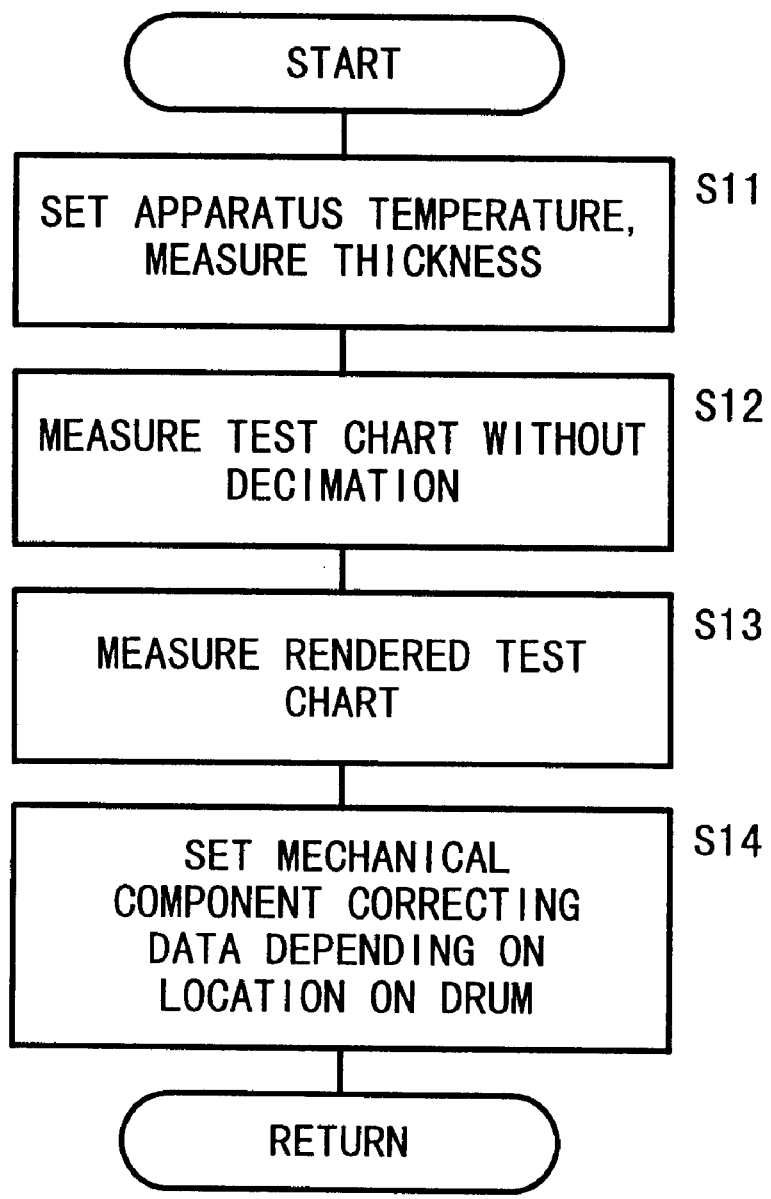
FIG. 10 is a flowchart of an operation sequence of the recording synchronizing signal generating unit shown in FIG. 9.

FIG. 10 shows a process of generating mechanical component correcting data Dm which is to be stored in advance in the mechanical component data memory 100.

In step S11 shown in FIG. 10, with the PS plate 12 whose thickness has been measured being mounted on the outer circumferential surface 16 of the drum 14, the temperature of the light beam image recording apparatus 10 that is placed in a constant-temperature chamber is set to a standard temperature of 20° C. and measured by the temperature sensor 102. The thickness of the PS plate 12 is entered into the CPU 64 via the input means 104.

In step S12, without the decimating counter 52 operating, i.e., with the gate circuit 54 being closed as shown in FIG. 9, the drum 14 is rotated at a constant speed, and image data for generating a reference test chart TC shown in FIG. 6 is stored in the memory 44 (see FIG. 1) and used to record an image corresponding to the reference test chart TC entirely on the PS plate 12.

In step S13, the PS plate 12 on which the image corresponding to the reference test chart TC (hereinafter referred to as "recorded test chart TC1") is removed from the drum 14, and the status of the recorded test chart TC1 on the PS plate 12, i.e., the recorded test chart TC1 which is suffering a distortion, is measured by a measuring means (not shown).

In step S14, the difference between the measured recorded test chart TC1 and the reference test chart TC is calculated, and a proportionality constant to eliminate the difference is calculated for each grid point and stored as mechanical component correcting data Dm in the mechanical component data memory 100.

To determine proportional component correcting data Dp to be stored in the proportional component data register 306, the processing in steps S11–S14 is carried out for each of different temperature settings, each of different thicknesses of the PS plate 12, and each of different diameters of the drum 14, thereby determining a formula for calculating proportional component correcting data Dp representing proportionality constants for the mechanical component correcting data Dm. The determined formula is stored in a rewritable read-only memory (ROM) such as a flash memory in the CPU 64.

The light beam image recording apparatus 10 shown in FIG. 1 which has the recording synchronizing signal generating unit 30B shown in FIG. 9 operates and offers advantages as follows:

The thickness and recording resolution information of the PS plate 12 are entered via the input means 104 into the CPU 64, and the temperature information is entered into the CPU 64. The CPU 64 calculates proportional component correcting data Dp from these supplied information, and stores the calculated proportional component correcting data Dp in the proportional component data register 306. Then, the main scanning motor 20 rotates the drum 14 at a constant speed. At this time, one of the input terminals of the combining means 309 is supplied with the calculated proportional component correcting data Dp stored in the proportional component data register 306.

While the drum 14 is rotating at a constant speed, the rotary encoder 24 detects, as A-phase pulses Pa, the information of recording position in the main scanning direction X, on the PS plate 12 by the optical unit 34. Based on the A-phase pulses Pa, the PLL circuit 50 generates an original clock CKa by multiplying the frequency of the A-phase pulses Pa.

The mechanical component correcting data Dm is read from the mechanical component data memory 100 at an address based on the output count from the A-phase counter 302 and the output count from the Z-phase counter 304, and supplied to the other input terminal of the combining means 309. The combining means 309 combines, i.e., multiplies the mechanical component correcting data Dm and the proportional component correcting data Dp, and supplies the product, i.e., a combined coefficient (beam position aligning coefficient) Dp·Dm to the decimating value calculating means 308.

The decimating value calculating means 308 determining a decimating value Sb at the time from the combined coefficient Dp·Dm and the reference value Ds, and sets the decimating value Sb as a preset value in the decimating counter 52.

The original clock CKa generated by the PLL circuit 50 is counted by the decimating counter 52, which outputs a decimating instruction Sa for decimating one pulse from the original clock CKa each time the count of the decimated counter 52 reaches the preset count or decimating value Sb.

Based on the decimating instruction Sa, the gate circuit 54 produces a clock CKb by decimating one pulse from the original clock CKa. The frequency divider 56 then frequency-divides the clock CKb at a fixed frequency-dividing ratio of 8, producing and outputting a pixel clock CKi for recording an image.

In this embodiment, when no pulse is decimated, the pixel clock CKi has a time interval corresponding to 8 pulses of the original clock CKa outputted from the PLL circuit 50. When one pulse is decimated, the pixel clock CKi has a time interval corresponding to 9 pulses of the original clock CKa. The increased time interval is equivalent to a pixel size that is 9/8 times the original pixel size, elongating the image locally by the increased time interval.

The decimating counter 52 is reset each time a Z-phase pulse Pz is supplied, i.e., each time the drum 14 makes one revolution.

Since the recording frequency of the pixel clock CKi is varied by decimating the original clock CKa based on the decimating value Sb as a predetermined count, the image recorded on the PS plate 12 can be rendered finely and accurately by determining in advance the decimating value Sb depending on the positional relationship between the PS plate 12 and the optical unit 34. The image recorded on the PS plate 12 by the light beam L in FIGS. 1 and 9 comprises a halftone dot image that is produced based on the presence or absence of pixels, i.e., the turning on or off of the light beam L.

The recording sheet may be a photosensitive medium such as a photosensitive film or the like other than the PS plate 12. If the optical unit 34 is replaced with an ink ejecting unit, then the recording sheet may be a sheet of paper.

The optical unit 34 used as the image recording means allows pixels having a diameter of 10 μm or less to be produced with the light beam L emitted thereby. The PS plate 12 used as the recording sheet allows the light beam image recording apparatus 10 to be constructed as a CTP (Computer To Plate) apparatus.

In the embodiment shown in FIGS. 1 and 9, the light beam image recording apparatus 10 is constructed as an external surface scanning light beam image recording apparatus in which the PS plate 12 mounted on the outer circumferential surface 16 of the drum 14 rotated by the main scanning motor 20 is scanned in the main scanning direction X by the light beam L emitted from the optical unit 34 to record a linear image on the PS plate along each main scanning line, and the optical unit 34 is moved in the auxiliary scanning direction Y along the shaft 18 of the drum 14 by the auxiliary scanning motor 40 to record a two-dimensional image on the PS plate 12. The image recorded on the PS plate 12 can maintain a desired level of dimensional accuracy irrespective of variations of the diameter of the drum 14.

The recording synchronizing signal generating unit shown in FIGS. 1 and 9 can be incorporated in the internal scanning type light beam image recording apparatus 90 shown in FIG. 3.

In the embodiment shown in FIGS. 1 and 9, when the decimating counter 52 detects a Z-phase pulse Pz outputted from the rotary encoder 24, 84 which detects each revolution of the drum 14, 70, the decimating counter 52 is reset to clear its count and then starts counting the original clock CKa up to the predetermined count Sd. The first correcting value, i.e., the count Sb, can be varied for each main scanning line thereby to facilitate a fine correcting process.

Figure 11:
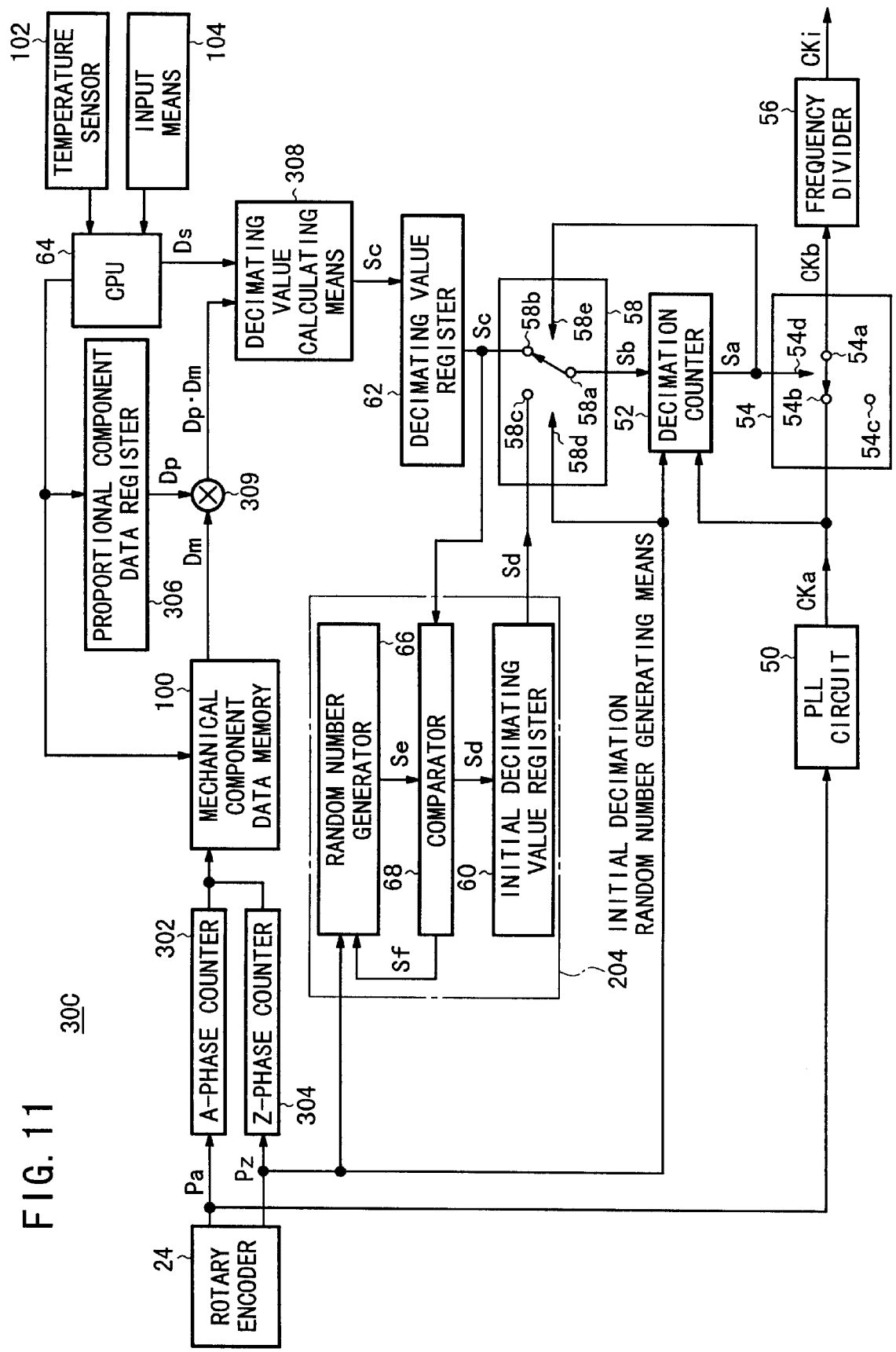
FIG. 11 is a block diagram of yet another recording synchronizing signal generating unit for use in the light beam image recording apparatus.

FIG. 11 shows yet another recording synchronizing signal generating unit 30C which is capable of varying a preset count Sd which is the first decimating value for each main scanning line.

In FIG. 11, the preset count Sb which is the first decimating value calculated by the decimating value calculating means 308 is stored in the decimating value register 62.

The recording synchronizing signal generating unit 30C is similar to the recording synchronizing signal generating unit 30B shown in FIG. 9 except that a switch 58 which comprises one-circuit, two-contact switch is inserted between the decimating value register 62 and the decimating counter 52. The switch 58 has control terminals 58d, 58e, a common terminal 58a, and fixed terminals 58b, 58c.

A count Sc stored in the decimating value register 62 is supplied to the fixed terminal 58b of the switch 58, and an initial count Sd stored as a first count in an initial decimating value register 60, which functions as an initial count setting means, of an initial decimation random number setting means 204, is supplied to the fixed terminal 58c of the switch 58.

When a Z-phase pulse Pz is supplied to the control terminal 58d of the switch 58, the common terminal 58a is temporarily connected to the fixed terminal 58c, supplying the initial count Sd as a count Sb (Sb=Sd) to a preset input terminal of the decimating counter 52.

When pulses of the original clock CKa are counted to the first count Sd by the decimating counter 52, the decimating counter 52 outputs a counting end signal as the decimating instruction Sa to the control terminal 54d of the gate circuit 54, shifting the output terminal 54a to the unconnected terminal 54c for a period of time in which one pulse of the original clock CKa is decimated.

The counting end signal as the decimating instruction Sa is also supplied to the control terminal 58e of the switch 58, shifting the common terminal 58a from the fixed terminal 58c to the fixed terminal 58b to allow a second and subsequent count Sc which has been set in the decimating value register 62 to be set as the preset count Sb in the setting terminal of the decimating counter 52 (Sb=Sc).

A random number Se which is equal to or smaller than the second and subsequent count Sc is set as a first count Sd in each main scanning line in the initial decimating value register 60.

If a random number Se generated by the random number generator 66 that is initiated by a Z-phase pulse Pz or a disagreement output Sf from the comparator 68 is equal to or smaller than the count Sc set in the decimating value register 62 (Se≦Sc), then the random number Se is set as the first count Sd in the initial decimating value register 60. If the random number Se is in excess of the count Sc set in the decimating value register 62, then a random number Se is generated again by the random number generator 66 based on the disagreement output Sf from the comparator 68 until the random number Se becomes equal to or smaller than the count Sc.

After the decimating counter 52 is reset by a Z-phase pulse Pz and until it generates a decimating instruction Sa, the decimating counter 52 is set to the count Sd corresponding to the random number Se generated by the random number generator 66 as a first count Sb for counting the original clock CKa. After the decimating counter 52 is reset by a Z-phase pulse Pz and until it generates a second and subsequent decimating instruction Sa, the decimating counter 52 is set to the preset count Sc as a second and subsequent count Sb for counting the original clock CKa.

The gate circuit 54 is closed, i.e., its switch is opened, for the period of one pulse each time a decimating instruction Sa is produced as a counting end signal by the decimating counter 52. Since the interval after the decimating counter 52 is reset by a Z-phase pulse Pz and until it subsequently generates a first decimating instruction Sa depends on the count Sd, which is of a value equal to or smaller than the count Sc and equal to the random number Se, corresponding to the random number Se, pixel clock positions are prevented from being corrected in fixed positions along the main scanning direction at all times, so that an image produced on the PS plate 12 does not suffer a quality degradation such as a striped irregularity or a moiré pattern.

Setting the first count Sd of the original clock CKa after the decimating counter 52 has been reset to a value between a value of 0 and the preset count Sc with the comparator 68 offers such advantages that the random number generator 66 is simple in structure and all corrected positions are prevented from being displaced largely, i.e., more than the count Sc.

Figure 12:
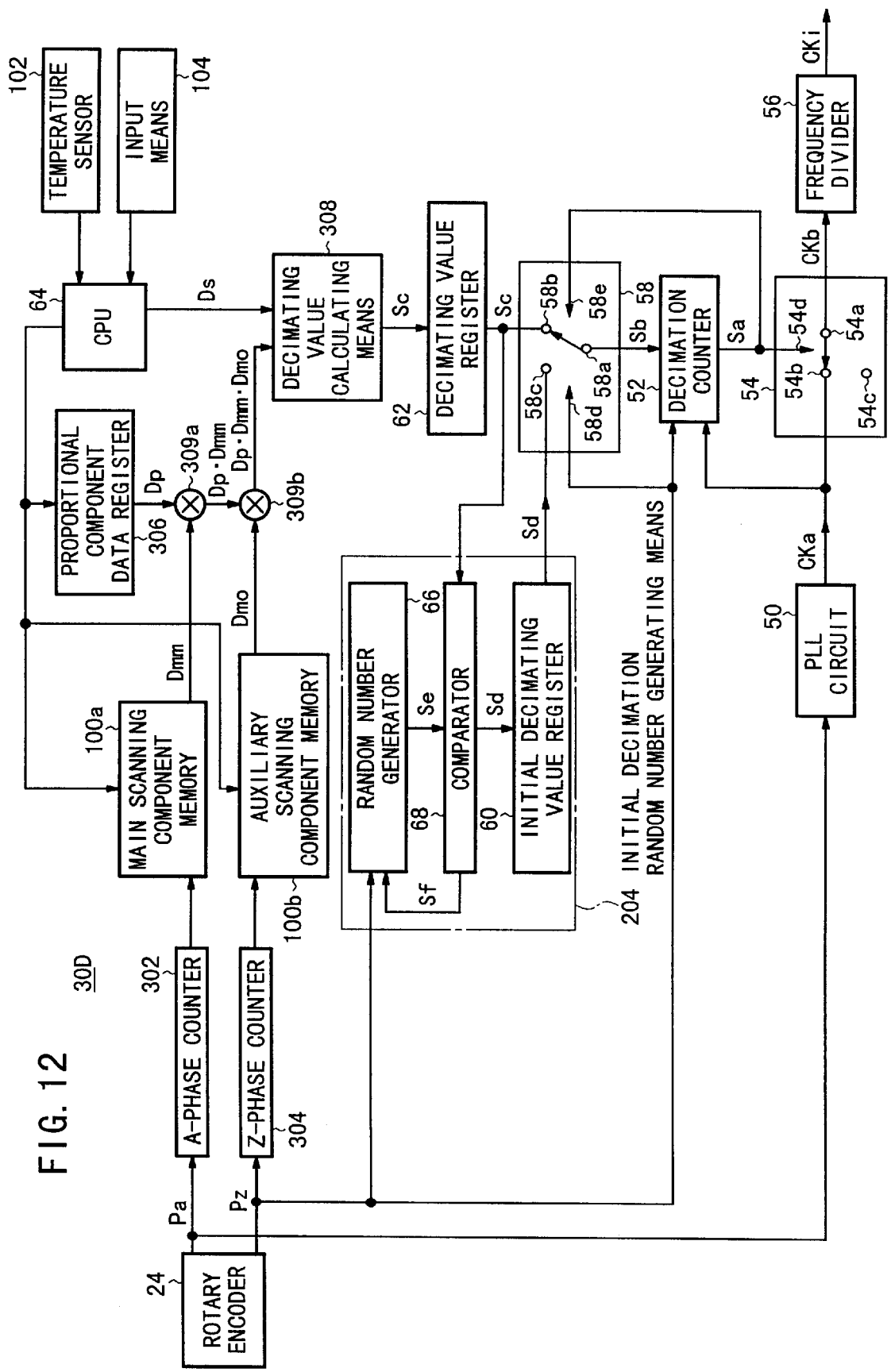
FIG. 12 is a block diagram of yet still another recording synchronizing signal generating unit for use in the light beam image recording apparatus.

FIG. 12 shows yet still another recording synchronizing signal generating unit 30D. The recording synchronizing signal generating unit 30D differs from the recording synchronizing signal generating unit 30C shown in FIG. 11 in that the mechanical component data memory 100 is divided into a main scanning component memory 100a and an auxiliary scanning component memory 100b, and the combining means 309 which comprises a multiplier is divided into two combining means 309a, 309a which comprise respective multipliers.

The main scanning component memory 100a stores main scanning component correcting data Dmm for correcting a graphical accuracy distortion in the circumferential direction of the drum 14, and the auxiliary scanning component memory 100b stores auxiliary scanning component correcting data Dmo for correcting a graphical accuracy distortion in the axial direction of the drum 14. The main scanning component correcting data Dmm outputted from the main scanning component memory 100a, the auxiliary scanning component correcting data Dmo outputted from the auxiliary scanning component memory 100b, and the proportional component correcting data Dp outputted from the proportional component data register 306 are combined into a combined correcting value (multiplied value) Dp·Dmm·Dmo by the combining means 309a, 309b. The combined correcting value Dp·Dmm·Dmo is supplied to the decimating value calculating means 308.

The decimating value calculating means 308 refers to the combined correcting value Dp·Dmm·Dmo and the reference value Ds, e.g., Ds=72, and calculates the count Sb as a decimating value. Specifically, the count Sb can be calculated as Sb=[Ds×Dp·Dmm·Dmo] (the special function [x] which is a mathematical symbol means the integral part of x).

In the embodiment shown in FIG. 12, the correcting data are classified into three components independent of each other.

Specifically, the first component is the proportional component correcting data Dp for correcting pixel intervals depending on the temperature and humidity of the apparatus, the thickness of the PS plate 12, and the recording resolution which are independent of the recording positions of the image data. The proportional component correcting data Dp is set and stored in the proportional component data register 306 from the CPU 64 each time an image is to be recorded. That is, the proportional component correcting data Dp is not kept continuously, but is calculated and stored in the proportional component data register 306 by the CPU 64 each time exposure conditions are determined when an image is to be recorded by the light beam.

The second component is the main scanning component correcting data (coefficient) Dmm for compensating for variations of the diameters, eccentricities, and shaft oscillations of the drums 14, 70, and disk eccentricities of the rotary encoders 24, 84, which are reproduced in the circumferential direction, i.e., the main scanning direction X of the drums 14, 70. The main scanning component correcting data Dmm is produced and stored as follows: When the light beam image recording apparatus 10, 90 are assembled, distortions in the main scanning direction X of an image recorded on the PS plate 12 by the light beam L which is emitted from the optical unit 34 and the spinner 80 based on the standard pixel clock from which no pulses are decimated are measured, and the measured distortions are stored as the main scanning component correcting data Dmm inherent in the apparatus in the main scanning component memory 100a. With the main scanning component correcting data Dmm thus determined, the storage capacity of the main scanning component memory 100a may be as large as one or several more lines in the main scanning direction X, and may be much smaller than if the mechanical component correcting data are stored in a two-dimensional fashion in the mechanical component data memory 100.

The third component is the auxiliary scanning component correcting data (coefficient) Dmo for compensating for variations in the auxiliary scanning direction Y of the diameters of the drums 14, 70, which are reproduced in the direction, i.e., the auxiliary scanning direction Y of the drums 14, 70, that is substantially perpendicular to the circumferential direction of the drums 14, 70. The auxiliary scanning component correcting data Dmo is produced and stored as follows: When the light beam image recording apparatus 10, 90 are assembled, distortions in the auxiliary scanning direction Y of an image recorded on the PS plate 12 based on the standard pixel clock from which no pulses are decimated are measured, and the measured distortions are stored as the auxiliary scanning component correcting data Dmo inherent in the apparatus in the auxiliary scanning component memory 100b. With the auxiliary scanning component correcting data Dmo thus determined, the storage capacity of the auxiliary scanning component memory 100b may be as large as one line in the auxiliary scanning direction Y, and may be much smaller than if the mechanical component correcting data are stored in a two-dimensional fashion in the mechanical component data memory 100.

When recording conditions such as exposure conditions are determined at the time of actually recording an image on the PS plate 12, the proportional component correcting data Dp is determined. When an image is to be recorded, the main scanning component correcting data Dmm and the auxiliary scanning component correcting data Dmo are read from the main scanning component memory 100a and the auxiliary scanning component memory 100b according to the output counts from the A-phase counter 302 and the Z-phase counter 304. The combined correcting value (multiplied value) Dp·Dmm·Dmo (the data Dp, Dmm, Dmo may be multiplied in any desired order) is supplied to the decimating value calculating means 308, which calculates the decimating value Sc from the combined correcting value Dp·Dmm·Dmo and the standard value Ds.

In the above embodiment, error factors such as variations of the diameters and eccentricities of the drums 14, 70, which are caused when the apparatus is assembled, and error factors such as the temperature, humidity, and recording resolution, which are caused each time an image is recorded by the light beam L, can separately be kept or set, for thereby reducing the burden of the calculating process to be carried out before an image is recorded.

Even if the diameters of the drums 14, 70 suffer variations, the pixel clock CKi for maintaining a desired level of graphical accuracy for recording on the PS plate 12 can be generated highly accurately with a simple arrangement.

In the above embodiment, as shown in FIGS. 11 and 12, the initial decimation random number generating means 204 is provided to determine the first decimating value, i.e., decimating position, in each main scanning cycle with a random number thereby to decimate a pulse at a different position in each line. Therefore, the recorded image is prevented from suffering a quality degradation such as a striped irregularity or a moiré pattern due to optical conflict with a halftone screen.

The principles of the light beam image recording apparatus 10 shown in FIG. 1 which incorporates either one of the recording synchronizing signal generating units 30B, 30C, 30D shown in FIGS. 9, 11, and 12 are also applicable to the external scanning type ink jet image recording apparatus 110 shown in FIG. 8 by replacing the exposure control unit 28, the LD driver 46, and the optical unit 34 respectively with the ejection control unit 128, the ink jet driver 146, and the ink jet head 134 shown in FIG. 8. The external scanning type ink jet image recording apparatus 110 can directly be used as a printing press such as an offset printing press.

According to the above embodiment of the present invention, data for correcting the level of graphical accuracy are generated and held efficiently with a resource saver based on mechanical component correcting data and proportional component correcting data against a distortion of an image, such as an expansion or a contraction, due to an error of a mechanical system for holding a recording sheet.

Specifically, when the image recording means scans the recording sheet mounted on the drum, which is a mechanical component, that is rotating at a constant speed, in the main scanning direction to record an image per each pixel clock pulse, and is moved in the auxiliary scanning direction to record a two-dimensional image on the recording sheet, the time to generating a pixel clock for energizing the image recording means is controlled based on mechanical component correcting data based on the relative positional relationship between the mechanical component and the image recording means and proportional component correcting data corresponding to recording conditions such as the temperature and humidity at the time of recording the image. The mechanical component correcting data include main and auxiliary scanning direction components each kept for one line, and the proportional component correcting data is not kept but re-calculated each time recording conditions are determined. Therefore, the amount of correcting data that is generated and held is minimized.

According to the present invention, consequently, the pixel clock for accurately plotting the image recorded on the recording sheet by the image recording means can be generated by a simple arrangement.

Since the first correcting process in the main scanning direction is carried out based on a random number, the image is prevented from suffering a quality degradation such as a striped irregularity or a moiré pattern.

Although certain preferred embodiments of the present invention have been shown and described in detail, it should be understood that various changes and modifications may be made therein without departing from the scope of the appended claims.

What is claimed is:

1. An image recording apparatus comprising:

image recording means for scanning a recording sheet in a main scanning direction to record an image on the recording sheet, said image recording means being movable in an auxiliary scanning direction substantially perpendicular to the main scanning direction to record a two-dimensional image on the recording sheet;

means for detecting recording position information in said main scanning direction;

original clock generating means for generating an original clock based on said recording position information in said main scanning direction;

decimation counting means for counting pulses of said original clock and outputting a decimating instruction to decimate a pulse from said original clock each time a preset count is reached;

decimating means for decimating a pulse from said original clock based on said decimating instruction and outputting a decimated clock; and frequency-dividing means for frequency-dividing the decimated clock at a fixed frequency-dividing ratio and outputting the frequency-divided clock as a pixel clock for recording the image.

2. An image recording apparatus according to claim 1, wherein said image recording means comprises an optical system for emitting a light beam to be applied to said recording sheet.

3. An image recording apparatus according to claim 2, further comprising:

a rotatable drum with said recording sheet mounted on an outer circumferential surface thereof;

means for controlling said optical system to apply the light beam to scan the recording sheet on said rotatable drum in the main scanning direction to record the image on the recording sheet; and means for moving said optical system in said auxiliary scanning direction along an axis of said rotatable drum to record the two-dimensional image on the recording sheet.

4. An image recording apparatus according to claim 3, further comprising:

means for detecting information per revolution of said drum;

said decimation counting means comprising means for resetting the count of said original clock and thereafter starting to count said original clock to said preset count when said information per revolution of said drum is detected.

5. An image recording apparatus according to claim 4, further comprising:

random number generating means for generating a random number;

said decimation counting means comprising means for setting a first preset count of said original clock after the count is reset to a value corresponding to the random number generated by said random number generating means, and outputting a decimating instruction to set a second and subsequent preset count of said original count to said preset count.

6. An image recording apparatus according to claim 5, wherein said first preset count of said original clock after the count is reset is set to said random number between a value of 0 and said preset value.

7. An image recording apparatus according to claim 3, wherein said preset count is determined depending on either one of a diameter of said drum, a temperature of the image recording apparatus, or a thickness of said recording sheet.

8. An image recording apparatus according to claim 2, further comprising:

a drum with said recording sheet mounted on an inner circumferential surface thereof;

means for rotating said optical system about an axis of said drum to cause the light beam emitted from said optical system to scan the recording sheet on said rotatable drum in the main scanning direction to record the image on the recording sheet; and means for moving said optical system in said auxiliary scanning direction along the axis of said drum to record the two-dimensional image on the recording sheet.

9. An image recording apparatus according to claim 8, further comprising:

means for detecting information per revolution of said optical system;

said decimation counting means comprising means for resetting the count of said original clock and thereafter starting to count said original clock to said preset count when said information per revolution of said optical system is detected.

10. An image recording apparatus according to claim 9, further comprising:

random number generating means for generating a random number;

said decimation counting means comprising means for setting a first preset count of said original clock after the count is reset to a value corresponding to the random number generated by said random number generating means, and outputting a decimating instruction to set a second and subsequent preset count of said original count to said preset count.

11. An image recording apparatus according to claim 1, wherein said image recording means comprises an ink jet head for applying ink to said recording sheet, further comprising:

a rotatable drum with said recording sheet mounted on an outer circumferential surface thereof;

means for controlling said ink jet head to apply the ink to scan the recording sheet on said rotatable drum in the main scanning direction to record the image on the recording sheet; and means for moving said ink jet head in said auxiliary scanning direction along an axis of said rotatable drum to record the two-dimensional image on the recording sheet.

12. An image recording apparatus comprising:

image recording means for scanning a recording sheet mounted on a mechanical component in a main scanning direction to record an image on the recording sheet per pulse of a pixel clock, said image recording means being movable in an auxiliary scanning direction substantially perpendicular to the main scanning direction to record a two-dimensional image on the recording sheet;

means for detecting recording position information in said main scanning direction;

original clock generating means for generating an original clock based on said recording position information in said main scanning direction;

decimation counting means for counting pulses of said original clock and outputting a decimating instruction to decimate a pulse from said original clock each time a preset count is reached;

decimating means for decimating a pulse from said original clock based on said decimating instruction and outputting a decimated clock;

frequency-dividing means for frequency-dividing the decimated clock at a fixed frequency-dividing ratio and outputting the frequency-divided clock as a pixel clock for recording the image;

storage means for storing mechanical component correcting data based on a relative positional relationship between said mechanical component and said image recording means; and decimating value calculating means for calculating said preset count from said mechanical component correcting data stored in said storage means and proportional component correcting data corresponding to recording conditions for said image recording means to record the image on said recording sheet, and setting the calculated preset count in said decimation counting means.

13. An image recording apparatus according to claim 12, further comprising:

means for detecting information per revolution of said drum; and random number generating means for generating a random number;

said decimation counting means comprising means for, when the count of said original clock is reset and thereafter said original clock starts to be counted to said preset count when said information per revolution of said drum is detected, setting a first preset count of said original clock after the count is reset to a value corresponding to the random number generated by said random number generating means, and outputting a decimating instruction to set a second and subsequent preset count of said original count to said preset count.

* * * * *